United States Patent
Mukherjee et al.

(10) Patent No.: US 7,939,198 B2
(45) Date of Patent: May 10, 2011

(54) COMPOSITE CATHODES, ELECTROCHEMICAL CELLS COMPRISING NOVEL COMPOSITE CATHODES, AND PROCESSES FOR FABRICATING SAME

(75) Inventors: Shyama P. Mukherjee, Tucson, AZ (US); Terje A. Skotheim, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 2174 days.

(21) Appl. No.: 09/795,915

(22) Filed: Feb. 27, 2001

(65) Prior Publication Data

US 2002/0055040 A1 May 9, 2002

Related U.S. Application Data

(63) Continuation of application No. 09/293,498, filed on Apr. 15, 1999, now Pat. No. 6,238,821, and a continuation of application No. 08/859,996, filed on May 21, 1997, now Pat. No. 5,919,587.

(60) Provisional application No. 60/018,115, filed on May 22, 1996.

(51) Int. Cl.
*H01M 4/58* (2010.01)
*H01M 10/05* (2010.01)

(52) U.S. Cl. .................. 429/218.1; 429/359; 429/341

(58) Field of Classification Search ............... 429/218.1, 429/213, 329, 341
See application file for complete search history.

(56) References Cited

U.S. PATENT DOCUMENTS

| 3,404,035 A | 10/1968 | Kummer et al. |
| 3,413,150 A | 11/1968 | Kummer et al. |
| 3,532,543 A | 10/1970 | Nole et al. |

(Continued)

FOREIGN PATENT DOCUMENTS

EP 0 602 984 A2 6/1994

(Continued)

OTHER PUBLICATIONS

Chaput et al. (1995). "Synthesis and Characterization of Vanadium Oxide Aerogels," *J. Non-Cryst. Solids* 188:11-18.

(Continued)

*Primary Examiner* — Stephen J. Kalafut
(74) *Attorney, Agent, or Firm* — Wolf, Greenfield & Sacks, P.C.

(57) ABSTRACT

The present invention pertains to composite cathodes suitable for use in an electrochemical cell, said cathodes comprising: (a) an electroactive sulfur-containing cathode material, wherein said electroactive sulfur-containing cathode material, in its oxidized state, comprises a polysulfide moiety of the formula —$S_m$—, wherein m is an integer equal to or greater than 3; and, (b) an electroactive transition metal chalcogenide composition, which encapsulates said electroactive sulfur-containing cathode material, and which retards the transport of anionic reduction products of said electroactive sulfur-containing cathode material, said electroactive transition metal chalcogenide composition comprising an electroactive transition metal chalcogenide having the formula $M_jY_k(OR)_l$ wherein: M is a transition metal; Y is the same or different at each occurrence and is oxygen, sulfur, or selenium; R is an organic group and is the same or different at each occurrence; j is an integer ranging from 1 to 12; k is a number ranging from 0 to 72; and l is a number ranging from 0 to 72; with the proviso that k and l cannot both be 0. The present invention also pertains to methods of making such composite cathodes, cells comprising such composite cathodes, and methods of making such cells.

1 Claim, 8 Drawing Sheets

U.S. PATENT DOCUMENTS

| | | | |
|---|---|---|---|
| 3,639,174 | A | 2/1972 | Kegelman |
| 3,791,867 | A | 2/1974 | Broadhead et al. |
| 3,806,369 | A | 4/1974 | Dey et al. |
| 3,907,591 | A | 9/1975 | Lauck |
| 3,915,743 | A | 10/1975 | Lauck |
| 3,953,231 | A | 4/1976 | Farrington et al. |
| 3,992,222 | A | 11/1976 | Walsh et al. |
| 4,008,357 | A | 2/1977 | Nishimura et al. |
| 4,009,052 | A | 2/1977 | Whittingham |
| 4,049,879 | A | 9/1977 | Thompson et al. |
| 4,071,665 | A | 1/1978 | Garth |
| 4,132,837 | A | 1/1979 | Soffer |
| 4,143,214 | A | 3/1979 | Chang et al. |
| 4,152,491 | A | 5/1979 | Chang et al. |
| 4,203,769 | A | 5/1980 | Guestaux |
| 4,258,109 | A | 3/1981 | Liang et al. |
| 4,268,587 | A | 5/1981 | Farrington et al. |
| 4,410,609 | A | 10/1983 | Peled et al. |
| 4,469,761 | A | 9/1984 | Bennett et al. |
| 4,576,697 | A | 3/1986 | Palmer |
| 4,576,883 | A | 3/1986 | Hope et al. |
| 4,664,991 | A | 5/1987 | Perichaud et al. |
| 4,720,910 | A | 1/1988 | Rourke et al. |
| 4,808,496 | A | 2/1989 | Hope et al. |
| 4,833,048 | A | 5/1989 | Dejonghe et al. |
| 4,844,996 | A | 7/1989 | Peled et al. |
| 4,917,974 | A | 4/1990 | De Jonghe et al. |
| 5,108,855 | A | 4/1992 | Daifuku et al. |
| 5,130,211 | A | 7/1992 | Wilkinson et al. |
| 5,162,175 | A | 11/1992 | Visco et al. |
| 5,324,599 | A | 6/1994 | Oyama et al. |
| 5,362,493 | A | 11/1994 | Skotheim et al. |
| 5,437,943 | A | 8/1995 | Fujii et al. |
| 5,441,831 | A | 8/1995 | Okamoto et al. |
| 5,506,072 | A | 4/1996 | Griffin et al. |
| 5,516,598 | A | 5/1996 | Visco et al. |
| 5,518,841 | A | 5/1996 | Sotomura |
| 5,529,860 | A | 6/1996 | Skotheim et al. |
| 5,538,812 | A | 7/1996 | Lee et al. |
| 5,601,947 | A | 2/1997 | Skotheim et al. |
| 5,620,813 | A | 4/1997 | Lee et al. |
| 5,648,187 | A * | 7/1997 | Skotheim ............... 429/213 |
| 5,712,057 | A | 1/1998 | Fauteux |
| 5,919,587 | A * | 7/1999 | Mukherjee et al. ........... 429/213 |
| 6,030,720 | A * | 2/2000 | Chu et al. .................. 429/329 X |
| 6,238,821 | B1 * | 5/2001 | Mukherjee et al. ........... 429/213 |
| 6,312,853 | B1 * | 11/2001 | Zhang et al. .................. 429/213 |
| 6,344,293 | B1 * | 2/2002 | Geronov .................... 429/218.1 |

FOREIGN PATENT DOCUMENTS

| | | |
|---|---|---|
| EP | 0638947 | 2/1995 |
| GB | 2084391 | 4/1982 |
| GB | 2137406 | 10/1984 |
| GB | 2273603 | 6/1994 |
| JP | 6-275313 | 9/1994 |
| JP | 08-124570 | 5/1996 |
| WO | 85/01293 | 3/1985 |

OTHER PUBLICATIONS

Colman, J.J. et al. (1995). "Photopolymerization of Carbon Disulfide Yields the High-Pressure-Phase $(CS_2)_x$," *J. Amer. Chem. Soc.* 117:11270-11277.

Liu et al. (1991). "Novel Solid Redox Polymerization Electrodes: All-Solid State, Thin Film, Rechargeable Lithium Batteries," *J. Electrochem. Soc.* 138:1891-1895 (Jul. 1991).

Tonomura et al. (Aug. 9, 1996). "Composite Cathodes and Their Manufacture, and Secondary Lithium Batteries Using them," *Chemical Abstracts* 1996:634687, pertaining to Japanese Patent Publication No. 8-203530 (Japanese Patent Application No. 95-11007 filed Jan. 26, 1995) published Aug. 9, 1996.

Coleman et al., "The Sulfur Electrode" Proceedings of the $6^{th}$ International Symposium on Power Sources, Brighton, Sussex, UK, Sep. 24-26, 1968, pp. 289-302.

Visco et al., "Solid Redox Polymerization Electrodes and Their use in All-Solid-State Batteries", *Mol. Cryst. Liq. Cryst.*, vol. 190, pp. 185-195, (1990).

Peled et al., "Rechargeable Lithium-Sulfur Battery" (Extended Abstract), *J. Power Sources*, vol. 26, 269:271, (May 1989).

Peled et al.; "Lithium-Sulfur Battery: Evaluation of Dioxolane-Based Electrolytes", *J. Electrochem. Soc.*, vol. 136, 1621-1624 (Jun. 1989).

Peramunage et al., "A Solid Sulfur Cathode for Aqueous Batteries", *Science*, vol. 261, pp. 1029-1032, (Aug. 1993).

Rauh et al., "Formation of Lithium Polysulfides in Aprotic Media", *J. Inorg. Nucl. Chem.*, vol. 39, 1761-1765, (1977).

Rauh et al:, "A Lithium/Dissolved Sulfur Battery with an Organic Electrolyte"; *J. Electrochem. Soc.*, vol. 126: 523-527, (1979).

Yamin et al, "Electrochemistry Noaqueous Lithium/Sulfur Cell", *J. Power Sources*, vol. 9, pp. 281-287, (1983).

Visco et al., "Thin-Film Technology for Solid-State Lithium Batteries Employing Solid Redox Polymerization Cathodes", pp. 89-92, Society of Vacuum Coaters, 1991.

Liu et al., "Novel Solid Redox Polymerization Electrodes Electrochemical Properties", *J. Electrochem. Soc.*, vol. 138, pp. 1896-1901 (Jul. 1991).

Ue et al., "Comparison of Cathode Utilization between Polymeric Organodisulfide and Titanium Disulfide in Solid Polymer Electrode Rechargeable Lithium Cells", *Denki Kagaku*, vol. 61, pp. 1409-1415. (1993).

Lui, "Novel Electrodes for Advanced Energy Storage System" Dissertation for Ph.D. at the University of Berkeley, Chapter2, pp. 3-6, 1989.

Rauh et al., "Rechargeability Studies of Ambient Temperature Lithium/Sulfur Batteries" $12^{th}$ IECEC, pp. 283-287 (1977).

Yamin et al., "Lithium Sulfur Battery-Oxidation/Reduction Mechanisms of Polysulfides in THF Solutions", *J. Electrochem. Soc.*, vol. 135, pp. 1045-1048 (May 1988).

Kavan et al., "*Electrochemistry of Sulfur Adsorbed on Carbon*," vol. 33, pp. 1605-1612 (1988).

Brummer et al., "Low Temperature Lithium/Sulfur Secondary Battery" (Annual Progress Report, Dec. 1, 1974-Dec. 1, 1975), EIC Corporation, Apr. 1976, Newton, Massachusetts.

Dominey, "Lithium Batteries" New Materials, Developments and Perspectives, 1994, New York, Industrial Chemistry Library, vol. 5, pp. 137-165.

United States Court of Appeals for the Federal Court, *Shyama Mukherjee et al.* vs. *May-Ying Chu et al.*, Case No. 2006-1450, Decision Decided Feb. 15, 2007, 10 pages.

United States Patent and Trademark Office, Before the Board of Patent Appeals and Interferences, *May Ying Chu et al.* vs. *Shyama P. Mukherjee et al.*, Interference No. 105,281, Decision on Motions—Bd. R. 127, 64 pages.

Unites States Patent and Trademark Office, Before the Board of Patent Appeals and Interferences, *May Ying Chu et al.* vs. *Shyama P. Mukherjee et al.*, Interferences No. 105,2881, Judgment—Bd. R. 127, 3 pages.

* cited by examiner

COMPOSITE CATHODES, ELECTROCHEMICAL CELLS COMPRISING NOVEL COMPOSITE CATHODES, AND PROCESSES FOR FABRICATING SAME

RELATED APPLICATION

This application is a continuation of U.S. patent application Ser. No. 09/293,498, filed Apr. 15, 1999 which is a continuation of U.S. patent application Ser. No. 08/859,996 filed May 21, 1997, now U.S. Pat. No. 5,919,587, which claims priority to U.S. provisional patent application Ser. No. 60/018,115 filed May 22, 1996, the contents of each of which are incorporated herein by reference in their entirety.

TECHNICAL FIELD

The present invention pertains generally to the field of cathodes and rechargeable electric current producing cells. More particularly, the present invention pertains to composite cathodes which comprise (a) an electroactive sulfur-containing cathode material, wherein said electroactive sulfur-containing cathode material, in its oxidized state, comprises a polysulfide moiety of the formula —$S_m$—, wherein m is an integer equal to or greater than 3; and, (b) an electroactive transition metal chalcogenide composition, which encapsulates said electroactive sulfur-containing cathode material, and which retards the transport of anionic reduction products of said electroactive sulfur-containing cathode material. The present invention also pertains to methods of making such composite cathodes, cells comprising such composite cathodes, and methods of making such cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the evolution of batteries continues, and particularly as lithium batteries become more widely accepted for a variety of uses, the need for safe, long lasting high energy batteries becomes more important. There has been considerable interest in recent years in developing high energy density cathode-active materials and alkali-metals as anode materials for high energy primary and secondary batteries. Several types of cathode materials for the manufacture of thin film lithium and sodium batteries are known in the art. The most widely investigated group are metallic or inorganic materials which include transition metal chalcogenides, such as titanium disulfide with alkali-metals as the anode as described in U.S. Pat. No. 4,009,052. Also among the cathode active chalcogenides, U.S. Pat. No. 4,049,879 lists transition metal phosphorous chalcogenides, and U.S. Pat. No. 3,992,222 describes cells using mixtures of $FeS_2$ and various metal sulfides as the electroactive cathode materials. U.S. Pat. No. 3,639,174 describes primary and secondary voltaic cells utilizing lithium aluminum alloy anodes and a reversible cathode depolarizer such as cupric sulfide, cuprous oxide, cupric carbonate, and the like that have low solubility in the electrolyte. U.S. Pat. No. 4,576,697 describes electroactive cathode materials in alkali-metal non-aqueous secondary batteries comprised of carbon-containing intercalatable layered or lamellar transition metal chalcogenides having the general formula $M_nX_2C$, wherein M is a transition metal selected from the group consisting of Ti, V, Cr, Fe, Zr, and Ta; X is sulfur; and n is 1-2. High energy density solid state cells comprising cathodes using selected ionically and electronically conductive transition metal chalcogenides in combination with other non-conductive electroactive cathode materials are described in U.S. Pat. No. 4,258,109.

Another type of cathode materials disclosed for use in lithium and sodium batteries are organic materials such as conductive polymers. A further type of organic type cathode materials are those comprised of elemental sulfur, organosulfur and carbon-sulfur compositions where high energy density is achieved from the reversible electrochemistry of the sulfur moiety with the alkali metal. U.S. Pat. No. 4,143,214 to Chang et al. describes cells having cathodes containing $C_vS$ wherein v is a numerical value from about 4 to about 50. U.S. Pat. No. 4,152,491 to Chang et al. relates to electric current producing cells where the cathode-active materials include one or more polymer compounds having a plurality of carbon monosulfide units. The carbon monosulfide unit is generally described as $(CS)_w$, wherein w is an integer of at least 5, and may be at least 50, and is preferably at least 100.

U.S. Pat. No. 4,664,991 to Perichaud et al. describes an organo-sulfur material containing a one-dimensional electric conducting polymer and at least one polysulfurated chain forming a charge-transfer complex with the polymer. Perichaud et al. use a material which has two components. One is the conducting or conductive polymer, which is selected from a group consisting of polyacetylenes, polyparaphenylenes, polythiophenes, polypyrroles, polyanilines and their substituted derivatives. The other is a polysulfurated chain which is in a charge transfer relation to the conducting polymer. The polysulfurated chain is formed by high temperature heating of sulfur with the conductive polymer to form appended chains of . . . —S—S—S—S— . . . of indeterminate length.

In a related approach, a PCT application (PCT/FR84/00202) of Armand et al. describes derivatives of polyacetylene-co-polysulfurs comprising units of $Z_q(CS_r)_n$ wherein Z is hydrogen, alkali-metal, or transition metal, q has values ranging from 0 to values equal to the valence of the metal ion used, values for r range from greater than 0 to less than or equal to 1, and n is unspecified. These derivatives are made from the reduction of polytetrafluoroethylene or polytrifluorochloroethylene with alkali-metals in the presence of sulfur, or by the sulfuration of polyacetylene with vapors of sulfur monochloride at 220° C.

U.S. Pat. No. 5,441,831 relates to an electric current producing cell which comprises a cathode containing one or more carbon-sulfur compounds of the formula $(CS_x)_n$, in which x takes values from 1.2 to 2.3 and n is equal to or greater than 2.

U.S. Pat. Nos. 4,833,048 and 4,917,974 to De Jonghe et al. describe a class of cathode materials made of organo-sulfur compounds of the formula $(R(S)_y)_n$ where y=1 to 6; n=2 to 20, and R is one or more different aliphatic or aromatic organic moieties having one to twenty carbon atoms. One or more oxygen, sulfur, nitrogen or fluorine atoms associated with the chain can also be included when R is an aliphatic chain. The aliphatic chain may be linear or branched, saturated or unsaturated. The aliphatic chain or the aromatic rings may have substituent groups. The preferred form of the cathode material is a simple dimer or $(RS)_2$. When the organic moiety R is a straight or a branched aliphatic chain, such moieties as alkyl, alkenyl, alkynyl, alkoxyalkyl, alkythioalkyl, or aminoalkyl groups and their fluorine derivatives may be included. When the organic moiety comprises an aromatic group, the group may comprise an aryl, arylalkyl or alkylaryl group, including fluorine substituted derivatives, and the ring may also contain one or more nitrogen, sulfur, or oxygen heteroatoms as well.

In the cell developed by De Jonghe et al. the main cathode reaction during discharge of the battery is the breaking and reforming of disulfide bonds. The breaking of a disulfide bond is associated with the formation of an $RS^-W^+$ ionic complex. The organo-sulfur materials investigated by De Jonghe et al. undergo polymerization (dimerization) and de-polymerization (disulfide cleavage) upon the formation and breaking of the disulfide bonds. The de-polymerization which occurs during the discharging of the cell results in lower molecular weight polymeric and monomeric species, namely soluble anionic organic sulfides, which can dissolve into the electrolyte and cause self-discharge as well as reduced capacity, thereby severely reducing the utility of the organo-sulfur material as cathode-active material and eventually leading to complete cell failure. The result is an unsatisfactory cycle life having a maximum of about 200 deep discharge-charge cycles, more typically less than 100 cycles as described in *J. Electrochem. Soc.*, Vol. 138, pp. 1891-1895 (1991).

A significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides, hereinafter referred to as anionic reduction products, from the cathode into the rest of the cell. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

Composite cathodes containing an electroactive transition metal chalcogenide have been described, typically as a random agglomeration or distribution of the electroactive materials, polymers, conductive fillers, and other solid materials in the cathode layer. In an exception to these homogeneous composite cathodes, U.S. Pat. Nos. 4,576,883, 4,720,910, and 4,808,496 disclose composite cathodes comprising spheres of an electroactive transition metal chalcogenide, such as vanadium pentoxide, encapsulated as a core material in a polymeric shell containing a polymer, an inorganic salt, such as a lithium salt, and optionally, a conductive carbon. These spheres are prepared by an emulsifying or a spray drying process. However, no mention is made in these references of encapsulation by transition metal chalcogenides, of any retarding of the transport of reduced species, of any use with elemental sulfur or sulfur-containing electroactive organic materials, or of any shape of the combined materials other than spheres.

U.S. Pat. No. 3,791,867 to Broadhead et al. describes cells containing cathodes consisting of elemental sulfur as the electroactive material present in a layered structure of a transition metal chalcogenide. This patent is directed at preventing the solubilization and transport of the elemental sulfur electroactive material by the electrolyte solvent. It has no mention of the formation of soluble reduced species of the electroactive material, such as soluble sulfides, or of the retarding or control by any means of the transport of these soluble reduced species into the electrolyte layer and other parts of the cell. The transition metal chalcogenides in this patent are limited to sulfides and selenides and do not include transition metal oxides. They are present either as a totally separate layer from the sulfur layer or pressed together with sulfur, in powder form, to provide the composite cathode. There is no mention of any organo-sulfur materials, carbon-sulfur materials, or polymeric binders in the composite cathode. Also there is no mention of improved capacity and battery cycle stability and life by the use of an electroactive transition metal chalcogenide with the elemental sulfur electroactive material.

U.S. Pat. No. 5,324,599 to Oyama et al. discloses composite cathodes containing disulfide organo-sulfur or polyorgano-disulfide materials, as disclosed in U.S. Pat. No. 4,833,048, by a combination with or a chemical derivative with a conductive polymer. The conductive polymers are described as capable of having a porous fibril structure and holding disulfide compounds in their pores. Japanese patent publication number Kokai 08-203530 to Tonomura describes the optional addition of electroactive metal oxide, such as vanadium oxide, to a composite cathode containing disulfide organo-sulfur materials and polyaniline as the conductive polymer. Japanese patent publication number Kokai 08-124570 describes a layered cathode with alternative layers of organo disulfide compound, electroactive metal oxide and conductive polymer with layers of mainly conductive polymers.

In a similar approach to overcome the dissolution problem with polyorgano-disulfide materials by a combination or a chemical derivative with a conductive, electroactive material, U.S. Pat. No. 5,516,598 to Visco et al. discloses composite cathodes comprising metal-organosulfur charge transfer materials with one or more metal-sulfur bonds, wherein the oxidation state of the metal is changed in charging and discharging the positive electrode or cathode. The metal ion provides high electrical conductivity to the material, although it significantly lowers the cathode energy density and capacity per unit weight of the polyorgano-disulfide material. This reduced energy density is a disadvantage of derivatives of organo-sulfur materials when utilized to overcome the dissolution problem. The polyorganosulfide material is incorporated in the cathode as a metallic-organosulfur derivative material, similar to the conductive polymer-organosulfur derivative of U.S. Pat. No. 5,324,599, and presumably the residual chemical bonding of the metal to sulfur within the polymeric material prevents the formation of highly soluble sulfide or thiolate anion species. However, there is no mention in these references of retarding of the transport of actual soluble reduced sulfide or thiolate anion species formed during charging or discharging of the cathode. Also, there is no mention in these references of the utility of transition metal chalcogenides, including oxides, in solving the dissolution problem with polyorganodisulfide materials. Instead, the transition metal chalcogenides are mentioned as specifically restricted to their known art of electroactive cathode insertion materials with lithium ions, with no utility with polyorganodisulfide materials, and with significantly less electrical conductivity than the charge-transfer materials described in these references.

Despite the various approaches proposed for the fabrication of high energy density rechargeable cells containing elemental sulfur, organo-sulfur and carbon-sulfur cathode materials, or derivatives and combinations thereof, there remains a need for materials and cell designs that retard the out-diffusion of anionic reduction products, from the cathode compartments into other components in these cells, improve the utilization of electroactive cathode materials and the cell efficiencies, and provide rechargeable cells with high capacities over many cycles.

It is therefore an object of the present invention to provide composite cathodes containing high loadings of electroactive sulfur-containing cathode material that exhibit a high utilization of the available electrochemical energy and retain this energy capacity without significant loss over many charge-discharge cycles.

It is another object of the present invention to provide composite cathodes, composite cathode materials, and composite cathode designs, for use in rechargeable cells which allow for highly selective transport of alkali-metal ions into and out of the sulfur-containing cathodes while retarding the out-diffusion of anionic reduction products from the cathodes into the cells.

It is a further object of this invention to provide convenient methods for fabricating such composite cathodes.

It is yet a further objective of this invention to provide energy storing rechargeable battery cells which incorporate such composite cathodes, and which exhibit much improved self-discharge characteristics, long shelf life, improved capacity, and high manufacturing reliability.

SUMMARY OF THE INVENTION

One aspect of the present invention pertains to a composite cathode for use in an electrochemical cell, said cathode comprising:

(a) an electroactive sulfur-containing cathode material, wherein said electroactive sulfur-containing cathode material, in its oxidized state, comprises a polysulfide moiety of the formula —$S_m$—, wherein m is an integer equal to or greater than 3; and, (b) an electroactive transition metal chalcogenide composition, which encapsulates said electroactive sulfur-containing cathode material, and which retards the transport of anionic reduction products of said electroactive sulfur-containing cathode material, said electroactive transition metal chalcogenide composition comprising an electroactive transition metal chalcogenide having the formula $M_j Y_k (OR)_l$ wherein: M is a transition metal; Y is the same or different at each occurrence and is oxygen, sulfur, or selenium; R is an organic group and is the same or different at each occurrence; j is an integer ranging from 1 to 12; k is a number ranging from 0 to 72; and l is a number ranging from 0 to 72; with the proviso that k and l cannot both 0. In one embodiment, j is an integer ranging from 1 to 6; k is a number ranging from 0 to 13; and, l is a number ranging from 0 to 18.

In one embodiment, the transition metal of said electroactive transition metal chalcogenide is selected from the group consisting of: Ti, V, Cr, Mn, Fe, Co, Ni, Cu, Y, Zr, Nb, Mo, Ru, Rh, Pd, Hf, Ta, W, Re, Os, and Ir.

In one embodiment, the electroactive transition metal chalcogenide is selected from the group consisting of: $TiS_2$, $Cr_2S_3$, $MoS_2$, $MoSe_2$, $MnS_2$, $NbS_2$, $VS_2$, $V_2S_5$, $WS_2$, and $V_2O_3S_3$.

In one embodiment, Y is oxygen. In one embodiment, the electroactive transition metal chalcogenide is selected from the group consisting of: $MoO_2$, $MnO_2$, $NbO_5$, $V_2O_5$, $WO_3$, $MoO_3$, $Ta_2O_5$, $V_2O_{4.5}(OCH(CH_3)_2)_{0.5}$, and $V_2O_{4.5}$.

In one embodiment, wherein l is greater than 0, said organic group is selected from the group consisting of: alkyl, aryl, arylalkyl, alkanone, alkanol, and alkoxy groups, each containing 1 to 18 carbons. In one embodiment, wherein l is greater than 0, said organic group is selected from the group consisting of: methyl, ethyl, propyl, isopropyl, butyl, isobutyl, tertiary butyl, pentyl, isopentyl, hexyl, octyl, ethylhexyl, isooctyl, dodecyl, cyclohexyl, decahydronaphthyl, phenyl, methylphenyl, ethylphenyl, hexylphenyl, dodecylphenyl, isopropylphenyl, benzyl, phenylethyl, naphthyl, acetyl, and acetoacetylonate.

In one embodiment, M is selected from the group consisting of V, Nb, Cr, Mo, Mn, W, and Ta; Y is oxygen; R is selected from the group consisting of: ethyl, isopropyl, butyl, acetyl, and acetylacetonate; j is a number ranging from 1 to less than 7; k is a number ranging from 1 to less than 14; and, l is equal to or less than about 1.5.

In one embodiment, the transition metal of said electroactive transition metal chalcogenide is V. In one embodiment, the transition metal of said electroactive transition metal chalcogenide is V and Y is oxygen. In one embodiment, the electroactive transition metal chalcogenide is a vanadium oxide. In one embodiment, the electroactive transition metal chalcogenide composition comprises an aerogel comprising a vanadium oxide or a xerogel comprising a vanadium oxide. In one embodiment, the electroactive transition metal chalcogenide is $V_2O_5$. In one embodiment, the electroactive transition metal chalcogenide is a vanadium alkoxide. In one embodiment, the electroactive transition metal chalcogenide is a vanadium oxide isopropoxide.

In one embodiment, the electroactive transition metal chalcogenide is present in said composite cathode in the amount of from 2 to 70 weight %. In one embodiment, the electroactive transition metal chalcogenide is present in said composite cathode in the amount of from 5 to 50 weight %. In one embodiment, the electroactive transition metal chalcogenide is present in said composite cathode in the amount of from 5 to 40 weight %.

In one embodiment, the electroactive transition metal chalcogenide composition comprises an aerogel or a xerogel comprising an electroactive transition metal chalcogenide. In one embodiment, the electroactive transition metal chalcogenide composition encapsulates said electroactive sulfur-containing cathode material by impregnation of said electroactive sulfur-containing cathode material into said electroactive transition metal chalcogenide composition. In one embodiment, the electroactive transition metal chalcogenide composition is present as an interface layer on the outer surface of said electroactive sulfur-containing cathode material. In one embodiment, the composite cathode comprises: (a) a first coating on an electrically conductive substrate, said first coating comprising said electroactive sulfur-containing cathode material; and, (b) a second coating over said first coating, said second coating comprising said electroactive transition metal chalcogenide composition. In one embodiment, the second coating comprises greater than 2.5 g/m² of said electroactive transition metal chalcogenide.

In one embodiment, the sulfur-containing material comprises elemental sulfur.

In one embodiment, the sulfur-containing material comprises a carbon-sulfur polymer material. In one embodiment, the sulfur-containing material is a carbon-sulfur polymer material, wherein m of the polysulfide moiety, —$S_m$—, of said carbon-sulfur polymer material is an integer equal to or greater than 6. In one embodiment, the polymer backbone chain of said carbon-sulfur polymer material comprises conjugated segments. In one embodiment, the polysulfide moiety, —$S_m$—, is covalently bonded by one or both of its terminal sulfur atoms on a side group to the polymer backbone chain of said carbon-sulfur polymer material. In one embodiment, the polysulfide moiety, —$S_m$—, is incorporated into the polymer backbone chain of said carbon-sulfur polymer material by covalent bonding of said polysulfide moiety's terminal sulfur atoms.

In one embodiment, the carbon-sulfur polymer material comprises greater than 75 weight percent of sulfur.

In one embodiment, the composite cathode further comprises one or more of the materials selected from the group consisting of: binders, electrolytes, and conductive additives. In one embodiment, the composite cathode further comprises one or more binders selected from the group consisting of: polytetrafluoroethylenes, polyvinylidene fluorides, ethylene propylene diene (EPDM) rubbers, polyethylene oxides, UV curable acrylates, UV curable methacrylates, and UV curable divinyl ethers. In one embodiment, the composite cathode further comprises one or more conductive additives selected from the group consisting of: conductive carbons, graphites, metal flakes, metal powders, and conductive polymers.

Another aspect of the present invention pertains to methods for preparing a composite cathode, as described herein, for use in an electrochemical cell.

In one embodiment, said methods comprise the steps of:

(a) dissolving or dispersing the electroactive transition metal chalcogenide in a liquid medium;

(b) adding to the composition resulting from step (a) the electroactive sulfur-containing cathode material;

(c) mixing the composition resulting from step (b) to dissolve or disperse said electroactive sulfur-containing cathode material, thereby forming a composition having a desired consistency and particle size distribution;

(d) casting the composition resulting from step (c) onto a suitable substrate or placing the composition resulting from step (c) into a mold;

(e) removing some or all of the liquid from the composition resulting from step (d) to provide a solid or gel-like composite cathode structure in the shape or form desired; and (f) optionally heating the composite cathode structure of step (e) to a temperature of 100° C. or greater.

In one embodiment, said methods comprise the steps of:

(a) dissolving or dispersing the electroactive transition metal chalcogenide in a liquid medium;

(b) adding to the composition resulting from step (a) the electroactive sulfur-containing cathode material;

(c) mixing the composition resulting from step (b) to dissolve or disperse said electroactive sulfur-containing cathode material, thereby forming a composition having a desired consistency and particle size distribution;

(d) contacting the composition resulting from step (c) with a gelling agent, thereby forming a sol-gel having a desired viscosity;

(e) casting the composition resulting from step (d) onto a suitable substrate or placing the composition resulting from step (d) into a mold;

(f) removing some or all of the liquid from the composition resulting from step (e) to provide a solid or gel-like composite cathode structure in the shape or form desired; and (g) optionally heating the composite cathode structure of step (f) to a temperature of 100° C. or greater.

In one embodiment, said methods comprise the steps of:

(a) dissolving the electroactive transition metal chalcogenide (e.g., electroactive transition metal alkoxide or electroactive transition metal chalcogenide precursor) in a liquid medium;

(b) contacting the composition resulting from step (a) with a gelling agent, thereby forming a sol-gel having a desired viscosity;

(c) adding to the composition resulting from step (b) the electroactive sulfur-containing cathode material;

(d) mixing the composition resulting from step (c) to dissolve or disperse said electroactive sulfur-containing cathode material, thereby forming a composition having a desired consistency and particle size distribution;

(e) casting the composition resulting from step (d) onto a suitable substrate or placing the composition resulting from step (d) into a mold;

(f) removing some or all of the liquid from the composition resulting from step (e) to provide a solid or gel-like composite cathode structure in the shape or form desired; and (g) optionally heating the composite cathode structure of step (f) to a temperature of 100° C. or greater.

In one embodiment, said methods comprise the steps of:

(a) coating a current collector substrate with a composition comprising the electroactive sulfur-containing cathode material and drying or curing said composition to form a solid or gel-type electroactive cathode layer on said current collector substrate;

(b) dissolving or dispersing the electroactive transition metal chalcogenide in a liquid medium; and (c) coating said electroactive cathode layer with the composition resulting from step (b) and drying or curing said composition to form a solid layer of said electroactive transition metal chalcogenide composition which covers the outer surface of said electroactive cathode layer.

In one embodiment, said methods comprise the steps of:

(a) coating a current collector substrate with a composition comprising the electroactive sulfur-containing cathode material and drying or curing said composition to form a solid or gel-type electroactive cathode layer on said current collector substrate;

(b) dissolving or dispersing the electroactive transition metal chalcogenide in a liquid medium;

(c) contacting the composition resulting from step (b) with a gelling agent, thereby forming a sol-gel having a desired viscosity; and (d) coating said electroactive cathode layer with the composition resulting from step (c) and drying or curing said composition to form a solid layer of said electroactive transition metal chalcogenide composition which covers the outer surface of said electroactive cathode layer.

Another aspect of the present invention pertains to electric current producing cells comprising (a) an anode; (b) a composite cathode, as described herein; and (c) an electrolyte between said anode and said composite cathode.

In one embodiment, the cell has an increase of specific capacity of greater than 150 mAh per gram of said electroactive transition metal chalcogenide, with respect to the specific capacity of said electroactive sulfur-containing cathode material. In one embodiment, the cell has an increase of specific capacity of greater than 200 mAh per gram of said electroactive transition metal chalcogenide, with respect to the specific capacity of said electroactive sulfur-containing cathode material. In one embodiment, the cell has an increase of specific capacity of greater than 300 mAh per gram of said electroactive transition metal chalcogenide, with respect to the specific capacity of said electroactive sulfur-containing cathode material. In one embodiment, the anode comprises one or more materials selected from the group consisting of: lithium metal, lithium-aluminum alloys, lithium-tin alloys, lithium intercalated carbons, lithium intercalated graphites, calcium metal, aluminum metal, sodium metal, and sodium alloys. In one embodiment, the electrolyte comprises one or more materials selected from the group consisting of: liquid electrolytes, gel polymer electrolytes, and solid polymer electrolytes. In one embodiment, the electrolyte comprises: (a) one or more solid polymer electrolytes selected from the group consisting of: polyethers, polyethylene oxides, polyimides, polyphosphazenes, polyacrylonitriles, polysiloxanes, polyether grafted polysiloxanes; derivatives of the foregoing; copolymers of the foregoing; crosslinked and network structures of the foregoing; blends of the foregoing; and (b) one or more ionic electrolyte salts. In one embodiment, the electrolyte comprises: (a) one or more materials selected from the group consisting of: polyethylene oxides, polypropylene oxides, polyacrylonitriles, polysiloxanes, polyimides, polyethers, sulfonated polyimides, perfluorinated membranes (Nafion™ resins), divinyl polyethylene glycols, polyethylene glycol-bis-(methyl acrylates), polyethylene glycol-bis(methyl methacrylates); derivatives of the foregoing; copolymers of the foregoing; crosslinked and network structures of the foregoing; blends of the foregoing; (b) one or more gel forming agents selected from the group consisting of: ethylene carbonate, propylene carbonate, N-methyl acetamide, acetonitrile, sulfolane, polyethylene glycols, 1,3-dioxolanes, glymes, siloxanes, and ethylene oxide grafted siloxanes; blends of the foregoing; and (c) one or more ionic electrolyte salts. In one embodiment, the gel-forming agent is a material of the following formula:

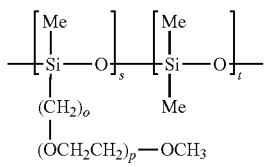

wherein o is an integer equal to or greater than 1; p is an integer equal to or greater than 0 and less than about 30, and, the ratio t/s is equal to or greater than 0. In one embodiment, the electrolyte comprises: (a) one or more electrolyte solvents selected from the group consisting of: ethylene carbonate, propylene carbonate, N-methyl acetamide, acetonitrile, sulfolane, polyethylene glycols, 1,3-dioxolanes, glymes, siloxanes, and ethylene oxide grafted siloxanes; blends of the foregoing; and (b) one or more ionic electrolyte salts. In one embodiment, the electrolyte comprises one or more ionic electrolyte salts selected from the group consisting of: $MClO_4$, $MAsF_6$, $MSO_3CF_3$, $MSO_3CH_3$, $MBF_4$, $MB(Ph)_4$, $MPF_6$, $MC(SO_2CF_3)_3$, $MN(SO_2CF_3)_2$,

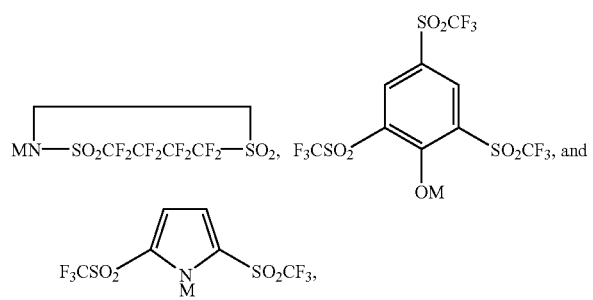

where M is Li or Na.

Another aspect of the present invention pertains to methods of forming an electric current producing cells comprising the steps of: (a) providing an anode; (b) providing a composite cathode, as described herein; and (c) enclosing an electrolyte between said anode and said composite cathode.

DETAILED DESCRIPTION OF THE INVENTION

Figure 1:
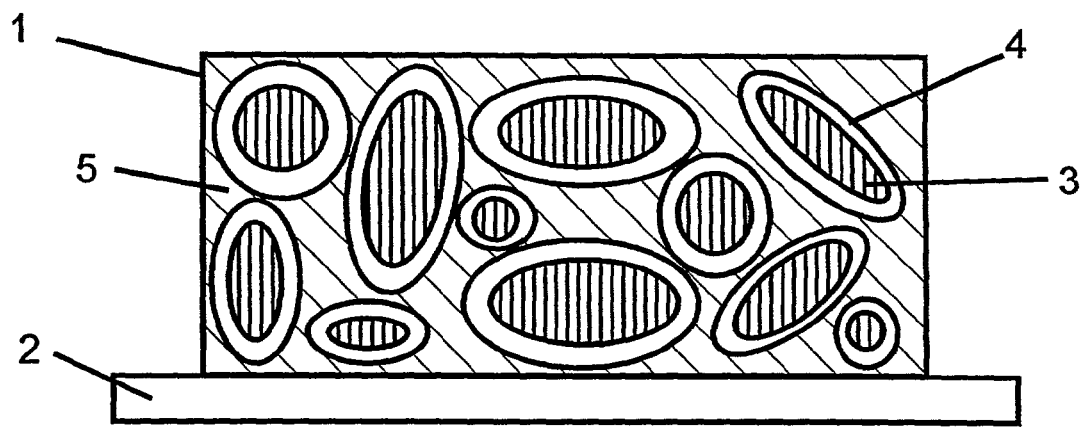
FIG. 1 shows a composite cathode on a current collector incorporating a cathode configuration wherein the electroactive sulfur-containing cathode material is encapsulated with a thin coating of the electroactive transition metal chalcogenide composition. These "core-shell" electroactive cathode materials are bound together in a composite cathode optionally using a binder containing a conductive additive and/or an electrolyte.

One aspect of the present invention pertains to novel high energy density composite cathodes comprised of:

(a) an electroactive sulfur-containing cathode material comprising one or more materials selected from the group consisting of elemental sulfur, organo-sulfur and carbon-sulfur compositions, and derivatives and combinations thereof; and (b) an electroactive transition metal chalcogenide composition comprising one or more electroactive transition metal chalcogenides.

In one embodiment, the present invention pertains to a composite cathode for use in an electrochemical cell, said cathode comprising:

(a) an electroactive sulfur-containing cathode material, wherein said electroactive sulfur-containing cathode material, in its oxidized state, comprises a polysulfide moiety of the formula $-S_m-$, wherein m is an integer equal to or greater than 3, as described herein; and, (b) an electroactive transition metal chalcogenide composition, which encapsulates said electroactive sulfur-containing ing cathode material, and which retards the transport of anionic reduction products of said electroactive sulfur-containing cathode material.

The electroactive transition metal chalcogenide facilitates the transport of alkali-metal and/or alkaline-earth metal cations reversibly from an electrolyte to the electroactive sulfur-containing cathode material, and also efficiently retards the transport of anionic reduction products from the composite cathode to the electrolyte or other layers or parts of the cell (e.g., retards the transport of anionic reduction products of said sulfur-containing material to the outside of said composite cathode). Thus, the transition metal chalcogenide composition effectively encapsulates or embeds the electroactive sulfur-containing cathode material and/or effectively entraps any soluble sulfide species generated during charging and discharging of the cell. The composite cathodes of the present invention thus provide high energy density and low out-diffusion of anionic reduction products.

The composite cathodes of the present invention are particularly preferred for use in electrolytic cells, rechargeable batteries, fuel cells, and the like that comprise organic type electroactive sulfur-containing cathode components and require high energy storage capacity, long shelf life, and a low rate of self-discharge.

Electroactive Transition Metal Chalcogenides

The composite cathodes of the present invention comprise an electroactive transition metal chalcogenide composition comprising one or more electroactive transition metal chalcogenides of the formula $M_jY_k(OR)_l$, wherein:

M is a transition metal;

Y is the same or different at each occurrence and is oxygen, sulfur or selenium;

R is an organic group and is the same or different at each occurrence;

j is an integer ranging from 1 to about 12;

k is a number ranging from 0 to about 72; and l is a number ranging from 0 to about 72;

with the proviso that k and l cannot both be 0;

wherein said electroactive transition metal chalcogenide composition effectively encapsulates or embeds the electroactive sulfur-containing cathode material.

In one embodiment, the electroactive transition metal chalcogenide composition consists essentially of an electroactive transition metal chalcogenide. In one embodiment, the electroactive transition metal chalcogenide composition further comprises additives such as binders, fillers, and/or electrolytes, as described herein.

The electroactive transition metal chalcogenide facilitates the transport of alkali-metal ions and/or alkaline-earth metal ions reversibly from an electrolyte in an electrolytic cell to the electroactive sulfur-containing cathode material, and also retards the transport of anionic reduction products from the composite cathode to the electrolyte or other layers or parts of the cell. Thus, useful electroactive transition metal chalcogenides are those that allow for either alkali-metal or alkaline-earth metal ion insertion and transport, but which retard or hinder the transport of anionic reduction products.

As used herein, the term "electroactive" material is a material which takes part in the electrochemical reaction of charge or discharge. As used herein, the term "electroactive transition metal chalcogenide" is an electroactive material having a reversible lithium insertion ability, wherein the transition metal is at least one selected from the group consisting of Ti, V, Cr, Mn, Fe, Nb, Mo, Ta, W, Co, Ni, Cu, Y, Zr, Ru, Rh, Pd, Hf, Re, Os, and Ir, and the chalcogenide is at least one selected from the group consisting of O, S, and Se.

Examples of preferred electroactive transition metal chalcogenides for use in the composite cathodes of the present invention are those of empirical formula $M_jY_k(OR)_l$ wherein:

M is a transition metal;

Y is the same or different at each occurrence and is selected from the group consisting of oxygen, sulfur, and selenium;

R is an organic group and is the same or different at each occurrence and is selected from the group of alkyl, aryl, arylalkyl, alkylaryl, alkanone, alkanol, and alkoxy groups each containing 1 to about 18 carbons;

j is an integer ranging from 1 to about 12;

k is a number ranging from 0 to about 72; and l is a number ranging from 0 to about 72;

with the proviso that k and l cannot both be 0.

More examples of preferred electroactive transition metal chalcogenides are those wherein:

M is selected from the group consisting of Ti, V, Cr, Mn, Fe, Co, Ni, Cu, Y, Zr, Nb, Mo, Ru, Rh, Pd, Hf, Ta, W, Re, Os, and Ir;

Y is the same or different at each occurrence and is selected from the group consisting of oxygen and sulfur;

R is the same or different at each occurrence and is selected from the group consisting of methyl, ethyl, propyl, isopropyl, butyl, isobutyl, tertiary butyl, pentyl, isopentyl, hexyl, octyl, ethylhexyl, isooctyl, dodecyl, cyclohexyl, decahydronaphthyl, phenyl, methylphenyl, ethylphenyl, hexylphenyl, dodecylphenyl, isopropylphenyl, benzyl, phenylethyl, naphthyl, acetyl, and acetoacetylonate ($-CH_2-CO-CH_2-CO-CH_3$);

j is an integer ranging from 1 to about 6;

k is a number ranging from 0 to about 13; and l is a number ranging from 0 to about 18;

with the proviso that k and l cannot both be 0.

Still more examples of preferred electroactive transition metal chalcogenides are those wherein:

M is selected from the group consisting of V, Nb, Cr, Mo, Mn, W, and Ta;

Y is oxygen;

R is selected from the group consisting of ethyl, isopropyl, butyl, acetyl, and acetylacetonate;

j is equal to or greater than 1 and less than 7;

k is equal to or greater than 1 and less than 14; and, l is equal to or less than about 1.5.

Still more examples of useful electroactive transition metal chalcogenides in the practice of this invention are $Cr_2O_3$, $CrO_3$, $Cr_3O_8$, $CrS_2$, $Cr_2S_3$, $CoO_2$, $CoS_2$, $Co_6S_5$, $Co_4S_3$, $CuO$, $Cu_2O$, $CuSe$, $CuS$, $Ti_2O_3$, $TiO_2$, $TiS_2$, $TiS_3$, $V_2O_3$, $VO_2$, $V_2O_4$, $V_2O_5V_3O_8$, $V_6O_{13}$, $V_2O_{4.5}$, $V_2O_3S_3$, $V_2O_{4.5}(OCH(CH_3)_2)_{0.5}$, $V_2S_3$, $VSe_2$, $MnS_2$, $MnO$, $Mn_2O_3$, $MnO_2$, $MnS$, $Fe_3O_4$, $Fe_2O_3$, $FeSe$, $FeS$, $FeS_2$, $NiO_2$, $NiSe$, $NiS_2$, $NiS$, $Y_2O_3$, $Y_2S_3$, $NbS_2$, $NbO$, $NbO_2$, $Nb_2O_5$, $NbSe_2$, $NbSe_3$, $MoO_2$, $MoO_3$, $MoSe_2$, $MoS_2$, $MoS_3$, $Rh_2O_3$, $RhO_2$, $PdO$, $PdS$, $HfO_2$, $Ta_2O_5$, $TaS_2$, $WO_{2.9}$, $WO_3$, $WSe_2$, $WS_2$, $ReO_2$, $Re_2O_7$, $ReS_2$, $Re_2S_7$, $OsO_4$, and $OsO_2$. Also useful are carbon-containing transition metal chalcogenides as described in U.S. Pat. No. 4,576,697.

Especially preferred are electroactive transition metal chalcogenides selected from the group consisting of: $TiS_2$, $Cr_2S_3$, $MoS_2$, $MoSe_2$, $MoO_2$, $MnO_2$, $MnS_2$, $Nb_2O_5$, $NbS_2$, $VS_2$, $V_2O_5$, $V_2S_5$, $WO_3$, $WS_2$, $MoO_3$, $Ta_2O_5$, $V_2O_{4.5}(OCH(CH_3)_2)_{0.5}$, $V_2O_{4.5}$, and $V_2O_3S_3$.

Particularly preferred are electroactive $V_2O_5$ and vanadium oxides of other stoichiometry, including vanadium oxysulfides.

Both electrically conductive and electrically non-conductive electroactive transition metal chalcogenides are useful in the practice of this invention. Preferred electroactive transition metal chalcogenides are those that are electrically conductive in addition to being ionically conductive. Some transition metal chalcogenides are inherently electrically conductive while others become electrically conductive upon insertion of alkali-metal or alkaline-earth metal cations. Both types are particularly useful. Without wishing to be bound to any particular theory, it is believed that good electrical conductivity in a transition metal chalcogenide in the composite cathodes of the present invention can provide for a more even distribution of electric fields within the composite cathode thereby providing a more even distribution of charge storage in the electroactive sulfur-containing cathode material in the composite cathode, improving charge and discharge characteristics, and improving overall capacity and utilization of the electroactive cathode materials. Additionally, transition metal chalcogenides which are electrically conductive can eliminate or reduce the need for incorporating non-electroactive conductive additives in the composite cathodes of the present invention. Especially preferred are electroactive transition metal chalcogenide compositions having electrical conductivities between about $10^{-5}$ S/cm and $10^{+3}$ S/cm (S=Siemens).

Preferred electroactive transition metal chalcogenides for use in the practice of the present also insert (or intercalate) and transport alkali-metal cations within the voltage range from about +0.1 to about +6 volts versus lithium. Especially preferred are electroactive transition metal chalcogenides which insert and transport alkali-metal cations within the voltage range of about +1.0 to +4.5 volts versus lithium. Particularly preferred are electroactive transition metal chalcogenides that are electroactive at voltages equal to and greater than the onset reduction voltage of the employed electroactive sulfur-containing cathode material in the composite cathode of the present invention, and also insert and transport alkali metal cations within a voltage range up to +4.5 volts versus lithium.

Also preferred in the practice of this invention are electroactive transition metal chalcogenides that independently or in combination with the electroactive sulfur-containing cathode composition provide energy storage capacity to the composite cathode. Preferred are compositions with additional specific energy storage capacities of greater than about 150 mAh/g. Especially preferred are compositions with additional storage capacities of greater than 200 mAh/g and particularly preferred are those with additional storage capacities of greater than about 300 mAh/g.

Especially preferred are electroactive transition metal chalcogenides, such as vanadium oxides, which may be processed by sol-gel techniques (such as those described below), and aerogel and xerogel processing methods, as known in the art. Without wishing to be bound to any particular theory, it is believed that composite cathodes fabricated by a sol-gel type process additionally provide enhanced adhesion to metallic current-collecting substrates and have good self-adhesion properties so as to minimize the need for adding binders to the composite cathode. It is further believed that the nanoscale porosity provided in the gels provides nanostructured electroactive transition metal chalcogenide materials that act like porous catalytic surfaces within the composite cathode. These active nanoscale structures effectively encapsulate, bind or entrap, the electroactive sulfur-containing cathode materials, as well as effectively bind or complex the anionic reduction products produced during discharge of the cells, thereby retarding their diffusion out of the cathode structures into the cells. In support of this, the experimental results on the zeta potential of vanadium oxide sol indicate that the sol is cationic in nature. Thus, it is expected that, in the cell in the presence of liquid electrolyte, the corresponding gel particles formed from an electroactive transition metal chalcogenide sol (e.g. vanadium oxide sol) can prevent or retard the anionic reduction products from being transported outside of the composite cathode layer. Further, since the electroactive transition-metal chalcogenide facilitates reversible metal-ion transport, these porous catalytic surfaces may facilitate the redox reactions of the electroactive sulfur-containing cathode materials on their surfaces thereby enhancing both capacity and cycleability of the electroactive materials. This is especially true when the electroactive transition metal chalcogenide composition is inherently electrically conductive in addition to being ionically conductive. Hence, it is believed that the transition metal chalcogenide in the composite cathodes of the present invention is highly multifunctional in terms of its performance.

Electroactive Sulfur-Containing Cathode Materials

The nature of the electroactive sulfur-containing cathode materials useful in the practice of this invention can vary widely. The electroactive properties of elemental sulfur and of sulfur-containing organic materials are well known in the art, and include the reversible formation of lithiated or lithium ion sulfides during the discharge or cathode reduction cycle of the battery cell.

Examples of electroactive sulfur-containing cathode materials are carbon-sulfur compositions of general formula $C_vS$, wherein v is a numerical value within the range of about 4 to about 50 as described in U.S. Pat. No. 4,143,214. Other examples of electroactive sulfur-containing cathode materials are those which contain one or more polymer compounds having a plurality of carbon monosulfide units that may generally be written as $(CS)_w$, wherein w is an integer of at least 5, as described in U.S. Pat. No. 4,152,491.

Further examples include those containing one or more carbon-sulfur compounds of formulae $(CS_x)_n$, $(CS_2)_n$, and $(C_2S_z)_n$. Compositions of general formula I, $$\text{---}(CS_x)_n\text{---} \qquad \qquad \text{I}$$

wherein x takes values from 1.2 to 2.3 and n is an integer equal to or greater than 2, are described in U.S. Pat. No. 5,441,831. Additional examples are those of general formula I wherein x ranges from greater than 2.3 to about 50, and n is equal to or greater than 2, as described in U.S. Pat. No. 5,601,947 and U.S. Pat. No. 5,690,702. These materials may optionally incorporate large fractions of elemental sulfur or polysulfur components, which on electrochemical reduction in an electrolytic cell, provide exceptionally high storage capacity per unit weight of material. Other examples of sulfur-containing compositions in the practice of this invention are materials of formula $(CS_2)_n$, made from carbon disulfide as described by J. J. Colman and W. C. Trogler in *J. Amer. Chem. Soc.* 1995, 117, 11270-11277. These various carbon-sulfur materials, when used as cathode materials in battery cells, may be optionally mixed with conductive components, electrolytes, and binders to improve electrochemical recycleability and capacity of the electroactive sulfur-containing cathode material.

Materials of formula I can be prepared by the reduction of carbon disulfide with alkali-metals, such as sodium or lithium, in an appropriate solvent such as dimethyl sulfoxide, dimethyl formamide (DMF), N-methyl pyrrolidinone, hexamethyl phosphoramide, and the like, incorporating long reaction times before work-up, as described in the aforementioned U.S. Pat. No. 5,601,947 and U.S. Pat. No. 5,690,702. Reaction times greater than about 41 hours provide electroactive carbon-sulfur cathode materials with elemental compositions containing between about 86 wt % and 98 wt % sulfur. Preferred compositions are those that have elemental compositions containing between about 90 wt % and 98 wt % sulfur. Although the detailed structures of the materials made by this method have not been completely determined, available structural information suggests that materials of this general formula are comprised of one or more of the structural units of formulae II-V,

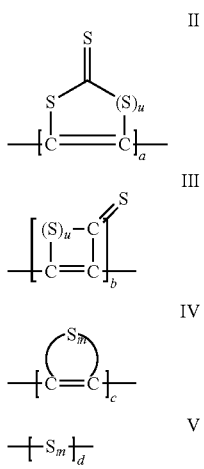

wherein m is the same or different at each occurrence and is greater than 2, u is the same or different at each occurrence and is equal to or greater than 1, and the relative amounts of a, b, c, and d comprising said carbon-sulfur polymer or polycarbon sulfide (PCS) material can vary widely and depend on the method of synthesis. Preferred PCS compositions with high electrochemical capacity are those containing substantial amounts of polysulfide species —($S_m$)— incorporated in and attached to the polymer backbone. Especially preferred compositions are those wherein m is on the average equal to or greater than 6. A key feature of these compositions is that the polymer backbone structure contains conjugated segments which may facilitate electron transport during electrochemical oxidation and reduction of the polysulfur side groups.

Additional examples of electroactive carbon-sulfur cathode materials are compositions of general formula VI,

VI wherein z ranges from greater than 1 to about 100, and n is equal to or greater than 2, as described in U.S. Pat. No. 5,529,860 and U.S. patent application Ser. No. 08/602,323, abandoned. The material may also comprise large fractions of elemental sulfur and polysulfur components, which on electrochemical reduction in an electrolytic cell, provide exceptionally high storage capacity per unit weight of material. These carbon-sulfur materials when used as cathode materials in battery cells, may be optionally mixed with conductive components, polymeric binders and electrolytes to further improve electrochemical recycleability and capacity of said electroactive cathode material.

Materials of formula VI can be prepared, as described in the aforementioned U.S. Pat. No. 5,529,860 and U.S. patent application Ser. No. 08/602,323 (abandoned), by the reaction of acetylene with a metal amide, such as sodium amide or sodium diisopropylamide, and elemental sulfur in a suitable solvent, such as liquid ammonia. Although the detailed structure of such materials has not been completely determined, available structural information suggests that these compositions are comprised of one or more of the structural units of formulae IV-V, VII-IX;

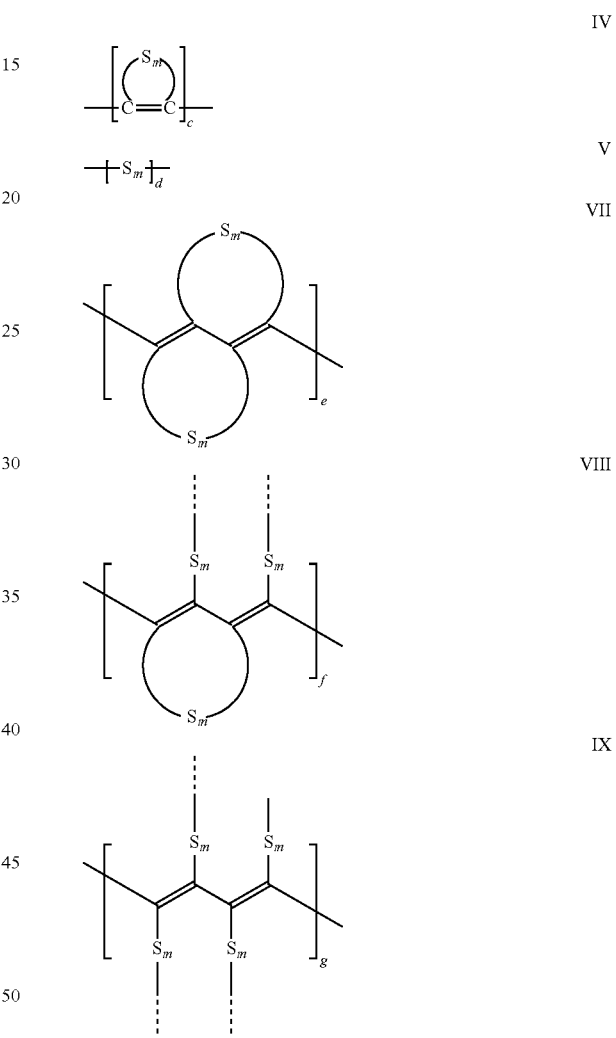

wherein m is the same or different at each occurrence and is greater than 2; and the relative amounts of c, d, e, f, and g, in said materials can vary widely and will depend on the method of synthesis. Preferred compositions are those wherein m is equal to or greater than 3, and especially preferred compositions are those wherein m is on the average equal to or greater than 6. These materials typically have elemental compositions containing between about 50 wt % and 98 wt % sulfur. Preferred compositions are those that have elemental compositions containing between about 80 wt % and 98 wt % sulfur.

Additional examples of electroactive sulfur-containing cathode materials are organo-sulfur substances containing one-dimensional electron conducting polymers and at least one polysulfurated chain forming a complex with said polymer, as described in U.S. Pat. No. 4,664,991. Other examples of electroactive sulfur-containing cathode materials are those comprising organo-sulfur compounds of the formula (R(S)$_y$)$_n$, where y=1 to 6; n=2 to 20, and R is one or more different aliphatic or aromatic organic moieties having one to twenty carbon atoms as described in U.S. Pat. Nos. 4,833,048 and 4,917,974. Still other examples of electroactive sulfur-containing cathode materials are organo-sulfur polymers with the general formula (R(S)$_y$)$_n$, as described in U.S. Pat. No. 5,162,175. Yet more examples of organo-sulfur cathode materials are those comprising a combination of a compound having a disulfide group and a conductive polymer, or an organo-disulfide derivative of a conductive polymer, as described in U.S. Pat. No. 5,324,599. Additional examples of organo-sulfur materials are the organo-sulfur derivatives of metal ions as described in U.S. Pat. No. 5,516,598.

Thus, in a preferred embodiment, composite cathodes of the present invention comprise (a) an electroactive sulfur-containing material, wherein said electroactive sulfur-containing material, in its oxidized state, comprises a polysulfide moiety of the formula —S$_m$—, wherein m is an integer equal to or greater than 3; and, (b) an electroactive transition metal chalcogenide composition, as described herein.

In one embodiment, the electroactive sulfur-containing material comprises elemental sulfur. In one embodiment, the electroactive sulfur-containing material comprises a carbon-sulfur polymer. In one embodiment, the electroactive sulfur-containing material comprises a carbon-sulfur polymer and m is an integer equal to or greater than 6. In one embodiment, the electroactive sulfur-containing material comprises a carbon-sulfur polymer, and the polymer backbone chain of said carbon-sulfur polymer comprises conjugated segments. In one embodiment, the electroactive sulfur-containing material comprises a carbon-sulfur polymer, and the polysulfide moiety, —S$_m$—, is covalently bonded by one or both of its terminal sulfur atoms on a side group to the polymer backbone chain of said carbon-sulfur polymer material. In one embodiment, the electroactive sulfur-containing material comprises a carbon-sulfur polymer, and the polysulfide moiety, —S$_m$—, is incorporated into the polymer backbone chain of said carbon-sulfur polymer by covalent bonding of said polysulfide moiety's terminal sulfur atoms. In one embodiment, the electroactive sulfur-containing material comprises a carbon-sulfur polymer comprising more than 75% sulfur by weight.

Quite surprisingly, it was discovered that when elemental sulfur is used as the electroactive sulfur-containing material in the composite cathodes of the present invention, the sulfur is rendered more highly electrochemically active providing very high reversible capacity. Low self discharge and high cycle life are provided by the effective encapsulation or entrapping of the elemental sulfur and retarding of sulfide out-diffusion by the transition metal chalcogenide compositions.

Composite Cathodes

One aspect of the present invention pertains to a composite cathode for use in an electrochemical cell, said cathode comprising:

(a) an electroactive sulfur-containing cathode material, wherein said electroactive sulfur-containing cathode material, in its oxidized state, comprises a polysulfide moiety of the formula —S$_m$—, wherein m is an integer equal to or greater than 3, as described herein; and, (b) an electroactive transition metal chalcogenide composition, which encapsulates said electroactive sulfur-containing cathode material, and which retards the transport of anionic reduction products of said electroactive sulfur-containing cathode material, said electroactive transition metal chalcogenide composition comprising an electroactive transition metal chalcogenide having the formula:

wherein
M is a transition metal;
Y is the same or different at each occurrence and is oxygen, sulfur, or selenium;
R is an organic group and is the same or different at each occurrence;
j is an integer ranging from 1 to 12;
k is a number ranging from 0 to 72; and
l is a number ranging from 0 to 72;
with the proviso that k and l cannot both be 0; as described herein.

The present invention also pertains to the design and configuration of composite cathodes of the present invention. The relative configuration of the electroactive sulfur-containing cathode material and the electroactive transition metal chalcogenide composition in the composite cathode is critical. In all cases, in order to retard out-diffusion of anionic reduction products from the cathode compartment in the cell, the sulfur-containing cathode material must be effectively separated from the electrolyte or other layers or parts of the cell by a layer of an electroactive transition metal chalcogenide composition. Surprisingly, it has been discovered that this layer can be dense or porous.

One design incorporates a fabricated cathode comprising a mixture of the electroactive sulfur-containing cathode material, the electroactive transition metal chalcogenide, and optionally binders, electrolytes, and conductive additives, which is deposited onto a current collector.

Another design is one where a coating of the electroactive sulfur-containing cathode material is encapsulated or impregnated by a thin coherent film coating of the cation transporting, anionic reduction product transport-retarding, transition metal chalcogenide composition.

Yet another design of said composite cathode of the present invention incorporates a cathode comprised of particulate electroactive sulfur-containing cathode materials individually coated with an encapsulating layer of the cation transporting, anionic reduction product transport-retarding, transition metal chalcogenide composition.

In one embodiment of the present invention, the cathode is comprised of particulate sulfur-containing cathode materials, generally less than 10 μm (microns) in diameter, individually coated with an encapsulating layer of an alkali-metal cation-transporting, yet anionic reduction product transport-retarding electroactive transition metal chalcogenide composition. A cathode fabricated from such a "core-shell" configuration of materials is illustrated in FIG. 1. Here, the prismatic cathode structure 1 in contact with a current collector 2 is comprised of compacted powders of the composite cathode. Each composite cathode particle is comprised of a core 3 of the electroactive sulfur-containing cathode material with an outer shell 4 of a retarding barrier layer comprising an electroactive transition metal chalcogenide. Optionally, said composite cathode may contain fillers 5 comprising various types of binders, electrolytes and conductive materials that are well known to those skilled in the art.

Figure 2:
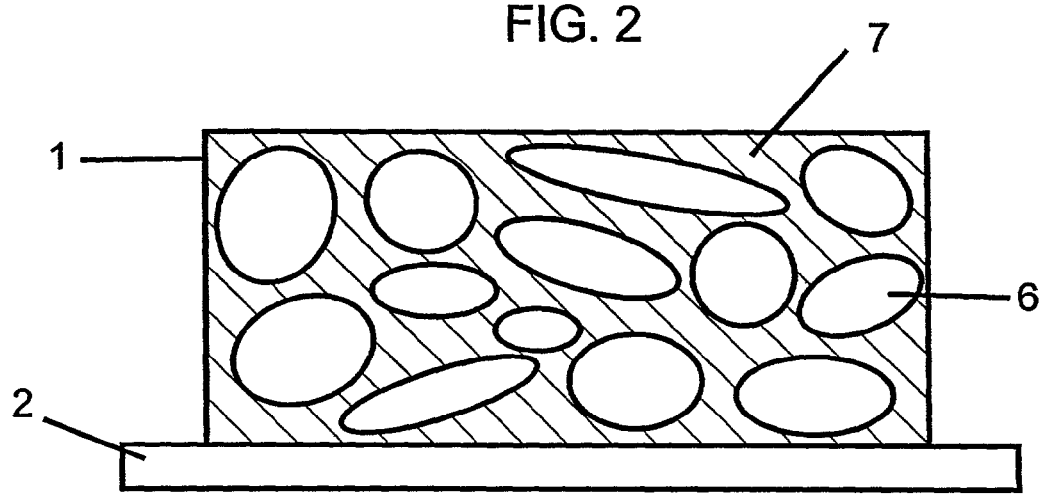
FIG. 2 shows a composite cathode configuration on a current collector wherein the electroactive transition metal chalcogenide composition remains as an interface layer at the boundaries of the electroactive sulfur-containing cathode particles.

Another embodiment of the present invention is shown in FIG. 2, which illustrates a prismatic composite cathode structure 1 in contact with a current collector 2 and comprising electroactive sulfur-containing cathode particles 6 as a dispersed phase in a matrix consisting of an electroactive transition metal chalcogenide phase 7 that optionally contains a binder, an electrolyte, and a conductive filler. The electroactive transition metal chalcogenide phase facilitates the highly selective and reversible transport of alkali-metal cations from the electroactive cathode materials in the composite cathode to the electrolyte and also retards the transport of anionic reduction products from the composite cathode to the electrolyte or other layers or parts of the cell.

Figure 3:
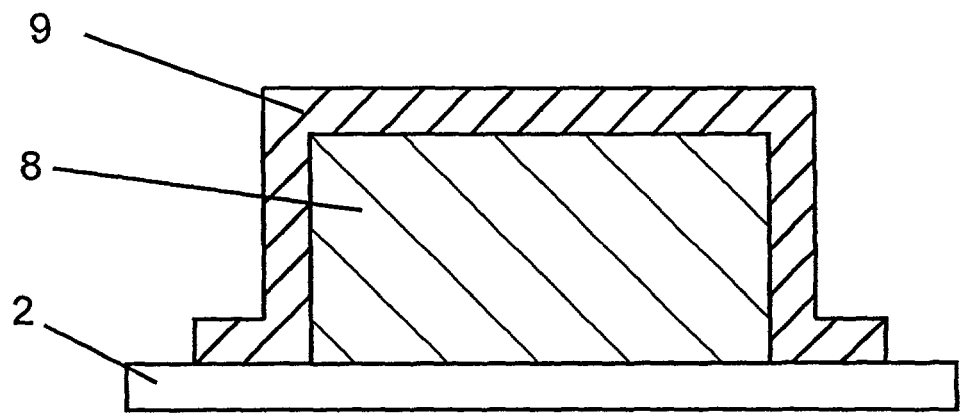
FIG. 3 shows a cathode design on a current collector wherein a coating of the electroactive sulfur-containing cathode material is coated or impregnated with a layer of the electroactive transition metal chalcogenide composition.

Yet another embodiment of the present invention incorporates a cathode comprising a coating of the electroactive sulfur-containing cathode material, binders, electrolytes, conductive additives on a current collector. This resulting cathode is encapsulated, or otherwise effectively separated from the electrolyte layer, by a coherent film coating or impregnation comprising one or more electroactive transition metal chalcogenides. Such a cathode is illustrated in FIG. 3. Here, the prismatic sulfur-containing cathode structure 8 in contact with the current collector 2 is effectively encapsulated with a layer of the electroactive transition metal chalcogenide composition 9. Either or both of the electroactive sulfur-containing cathode material and the electroactive transition metal chalcogenide material may optionally contain binders, electrolytes, and conductive fillers. Of course, if such a composite cathode is to be used in combination with a solid electrolyte, one need only employ an effective layer of the transition metal chalcogenide between the solid electrolyte and the cathode structure rather than coating the entire cathode structure.

Figure 4:
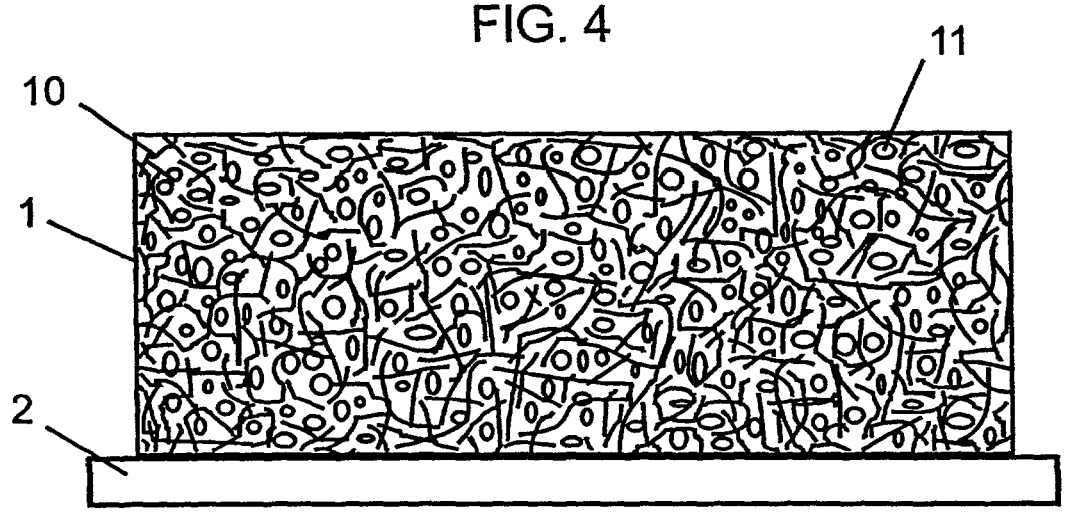
FIG. 4 shows a cathode design on a current collector wherein the electroactive transition metal chalcogenide composition is an aerogel or xerogel and forms a highly porous, fibrous, and ultrafine sponge-like network into which the electroactive sulfur-containing cathode materials are embedded or encapsulated. The matrix of the transition metal chalcogenide composition may optionally contain binders, electrolytes, and conductive additives.

Still another embodiment of the present invention is shown in FIG. 4, which illustrates a prismatic composite cathode structure 1 in contact with a current collector 2 and comprising a highly porous, fibrous, and ultrafine sponge-like structure or network of an aerogel or xerogel of an electroactive transition metal chalcogenide composition 10 into which the electroactive sulfur-containing cathode materials 11 are embedded or encapsulated. The fibrous nature of such aerogel and xerogel materials is described, for example, by Chaput et al., *J. Non-Cryst. Solids* 1995, 118, 11-18, and references therein. Again, the electroactive transition metal chalcogenide matrix optionally contains a binder, an electrolyte, and/or a conductive additive.

For the composite cathode structures which employ a composite cathode bound to a current collector, such as those illustrated FIGS. 1, 2, and 4, preferred electroactive transition metal chalcogenides are those which yield composite cathodes having good adhesion to the metal current collector. The use of such materials can greatly facilitate the collection of current from the composite cathode and improve the integrity of the cathode structure.

In one embodiment of the present invention, the composite cathode is a particulate, porous electroactive transition metal chalcogenide composition, optionally containing non-electroactive metal oxides, such as silica, alumina, and silicates, that is further impregnated with a soluble electroactive sulfur-containing cathode material. This is especially beneficial in increasing the energy density and capacity above that achieved with the electroactive sulfur-containing cathode material (e.g., electroactive organo-sulfur and carbon-sulfur cathode materials) only.

The relative amounts of electroactive transition metal chalcogenide and electroactive sulfur-containing cathode material in the composite cathode can vary widely so long as sufficient electroactive transition metal chalcogenide is present to effectively retard anionic reduction products from out-diffusing into the surrounding medium or layer while effectively maintaining or improving the capacity and cell efficiencies. Typically, the amount of electroactive transition metal chalcogenide used in the complete composite cathode will vary from 2 wt % to about 70 wt %. When used in a separate layer of the composite cathode, such as in FIG. 3, the amount of electroactive transition metal chalcogenide in the separate layer only will vary from about 5 wt % to 100 wt %. Preferred composite cathodes are those that contain between about 5 wt % and 50 wt % electroactive transition metal chalcogenide compounds, and most preferred composite cathodes contain between about 5 wt % and 40 wt % electroactive transition metal chalcogenide compounds.

The composite cathodes of the present invention may further comprise a non-electroactive metal oxide to further improve the fabrication as well as the electrical and electrochemical properties of the resulting cathode. Examples of such non-electroactive metal oxides are silica, alumina, and silicates. Preferably, such metal oxides are porous in nature, and have a high surface area of greater than 20 $m^2/g$. Typically, the non-electroactive metal oxide material is incorporated or mixed with the transition metal chalcogenide during fabrication of the composite cathode.

The composite cathodes of the present invention may further comprise one or more materials selected from the group of binders, electrolytes, and conductive additives, usually to improve or simplify their fabrication as well as improve their electrical and electrochemical characteristics. Similarly, such materials may be used as a matrix for the electroactive sulfur-containing cathode material, the electroactive transition metal chalcogenide, or both.

The choice of binder material may vary widely so long as it is inert with respect to the composite cathode materials. Useful binders are those materials, usually polymeric, that allow for ease of processing of battery electrode composites and are generally known to those skilled in the art of electrode fabrication. Examples of useful binders are organic polymers such as polytetrafluoroethylene (s®), polyvinylidine fluorides ($PVF_2$ or PVDF), ethylene-propylenediene diene (EPDM) rubbers, polyethylene oxides (PEO), UV curable acrylates, UV curable methacrylates, and UV curable divinylethers, and the like.

Useful conductive additives are those known to one skilled in the art of electrode fabrication and are such that they provide electrical connectivity to the majority of the electroactive materials in the composite cathode. Examples of useful conductive fillers include conductive carbons (e.g., carbon black), graphites, metal flakes, metal powders, electrically conductive polymers, and the like.

Examples of useful electrolytes include any liquid, solid, or solid-like materials capable of storing and transporting ions, so long as the electrolyte material is chemically inert with respect to the composite cathode material and the electrolyte material facilitates the transportation of ions.

In those cases where binder and conductive filler are desired, the amounts of binder and conductive filler can vary widely and the amounts present will depend on the desired performance. Typically, when binders and conductive fillers are used, the amount of binder will vary greatly, but will generally be less than about 15 wt % of the composite cathode. Preferred amounts are less than 10 wt %. The amount of conductive filler used will also vary greatly and will typically be less than 15 wt % of the composite cathode. Preferred amounts of conductive additives are generally less than 12 wt %.

Particularly preferred composite cathodes are those comprising an electroactive sulfur-containing material (e.g., a carbon-sulfur polymer or elemental sulfur); $V_2O_5$; conductive carbon; and a PEO binder.

Methods of Making Composite Cathodes

One aspect of the present invention pertains to methods for fabricating composite cathodes.

One method relates to the fabrication of composite cathodes by the physical mixture of the electroactive sulfur-containing cathode material, the electroactive transition metal chalcogenide, and optionally binders, electrolytes, and conductive fillers either as dry solids, or as a slurry in a solvent or mixtures of solvents. The resulting mixture is then fabricated into a cathode structure of desired dimensions, for example, by casting, coating, dip-coating, extrusion, calendering, and other means known in the art.

Thus, in one embodiment, the present invention pertains to methods for preparing the composite cathodes of the present invention, said methods comprising the steps of:

(a) dissolving or dispersing an electroactive transition metal chalcogenide in a liquid medium;

(b) adding to the composition resulting from step (a) an electroactive sulfur-containing cathode material;

(c) mixing the composition resulting from step (b) to dissolve or disperse said electroactive sulfur-containing cathode material, thereby forming a composition having a desired consistency and particle size distribution;

(d) casting the composition resulting from step (c) onto a suitable substrate or placing the composition resulting from step (c) into a mold;

(e) removing some or all of the liquid from the composition resulting from step (d) to provide a solid or gel-like composite cathode structure in the shape or form desired; and (f) optionally heating the composite cathode structure of step (e) to a temperature of 100° C. or greater.

Examples of liquid media suitable for use in the methods of the present invention include aqueous liquid, non-aqueous liquids, and mixtures thereof. Especially preferred liquids are non-aqueous liquids such as methanol, ethanol, isopropanol, propanol, butanol, tetrahydrofuran, dimethoxyethane, acetone, toluene, xylene, acetonitrile, and cyclohexane. Most preferred liquids are those selected from the group consisting of acetone, acetonitrile, and dimethoxyethane.

Another method relates to the fabrication of a composite cathode by a sol-gel method wherein the electroactive sulfur-containing cathode material, and optionally binders and conductive fillers, are suspended or dispersed in a medium containing a sol (solution) of the desired electroactive transition metal chalcogenide composition; the resulting composition is first converted into a sol-gel (e.g., a gel-like material having a sol-gel structure or a continuous network-like structure) by the addition of a gelling agent, and the resulting sol-gel further fabricated into a composite cathode.

The electroactive transition metal chalcogenide sols are dispersions of colloidal particles in the liquid. Dispersions of colloidal particles of the electroactive transition metal chalcogenides can be prepared by a variety of methods known in the art, including, for example, the methods described in U.S. Pat. No. 4,203,769. From the sol, a sol-gel or gel-like material is formed which has an interconnected, rigid network, typically having submicron-sized pores. This network (e.g., oxide network) is the result of an inorganic polymerization reaction. Typically the precursor for forming the sol-gel is a molecular derivative, such as an transition metal alkoxide or a transition metal acetylacetonate.

Thus, in one embodiment, the present invention pertains to methods for preparing the composite cathodes of the present invention, said methods comprising the steps of:

(a) dissolving or dispersing an electroactive transition metal chalcogenide in a liquid medium;

(b) adding to the composition resulting from step (a) an electroactive sulfur-containing cathode material;

(c) mixing the composition resulting from step (b) to dissolve or disperse said electroactive sulfur-containing cathode material, thereby forming a composition having a desired consistency and particle size distribution;

(d) contacting the composition resulting from step (c) with a gelling agent, thereby forming a sol-gel having a desired viscosity;

(e) casting the composition resulting from step (d) onto a suitable substrate or placing the composition resulting from step (d) into a mold;

(f) removing some or all of the liquid from the composition resulting from step (e) to provide a solid or gel-like composite cathode structure in the shape or form desired; and (g) optionally heating the composite cathode structure of step (f) to a temperature of 100° C. or greater.

In another embodiment, the present invention pertains to methods for preparing the composite cathodes of the present invention, said methods comprising the steps of:

(a) dissolving an electroactive transition metal chalcogenide (e.g., electroactive transition metal alkoxide or electroactive transition metal chalcogenide precursor) in a liquid medium;

(b) contacting the composition resulting from step (a) with a gelling agent, thereby forming a sol-gel having a desired viscosity;

(c) adding to the composition resulting from step (b) an electroactive sulfur-containing cathode material;

(d) mixing the composition resulting from step (c) to dissolve or disperse said electroactive sulfur-containing cathode material, thereby forming a composition having a desired consistency and particle size distribution;

(e) casting the composition resulting from step (d) onto a suitable substrate or placing the composition resulting from step (d) into a mold;

(f) removing some or all of the liquid from the composition resulting from step (e) to provide a solid or gel-like composite cathode structure in the shape or form desired; and (g) optionally heating the composite cathode structure of step (f) to a temperature of 100° C. or greater.

Gelling agents that can effectively cause the electroactive transition metal chalcogenide to form a sol-gel (e.g., a gel-like or network structure) include both chemical and physical agents. Useful chemical gelling agents are those that convert the electroactive transition metal chalcogenide to a form with lower solubility in the liquid medium used. Typical effective chemical agents are water, and lower alcohols such as methanol, ethanol, isopropanol, ethylene glycol, and the like. Other useful chemical gelling agents are non-solvents for the electroactive transition metal chalcogenide, acids, and polymeric binders. With the addition of small amounts of non-solvent, the electroactive transition metal chalcogenide will gradually precipitate giving rise to powders or gel-like structures. Useful physical gelling agents are heating, cooling, light, x-rays, and electron beams. Thus, the application of heat may cause decomposition of alkoxy groups or other functional groups in a electroactive transition metal compound leading to a new composition with a networked structure giving rise to a gel. Likewise, the application of light, x-rays, or electron beams may cause decomposition or crosslinking of the alkyl groups or other functional groups, giving rise to a gel or precipitated slurry of the composite cathode.

This sol-gel method can be used to provide composite cathodes in at least two different configurations. One relates to a configuration in which particulate electroactive sulfur-containing cathode material is encapsulated with a layer of the electroactive transition metal chalcogenide composition. The other relates to a configuration in which the electroactive sulfur-containing cathode material is embedded in a continuous network or continuous phase of the electroactive transition metal chalcogenide composition. The transition metal chalcogenide phase can be viewed as an interfacial boundary layer around the particulate electroactive sulfur-containing cathode material. This boundary layer has a high concentration of interconnecting nanoscale porosity.

In another embodiment, the present invention pertains to methods for preparing the composite cathodes of the present invention, said methods comprising the steps of:

(a) coating a current collector substrate with a composition comprising an electroactive sulfur-containing cathode material and drying or curing said composition to form a solid or gel-type electroactive cathode layer on said current collector substrate;

(b) dissolving or dispersing an electroactive transition metal chalcogenide in a liquid medium;

(c) coating said electroactive cathode layer with the composition resulting from step (b) and drying or curing said composition to form a solid layer of said electroactive transition metal chalcogenide composition which covers the outer surface of said electroactive cathode layer.

In another embodiment, the present invention pertains to methods for preparing the composite cathodes of the present invention, said methods comprising the steps of:

(a) coating a current collector substrate with a composition comprising an electroactive sulfur-containing cathode material and drying or curing said composition to form a solid or gel-type electroactive cathode layer on said current collector substrate;

(b) dissolving or dispersing an electroactive transition metal chalcogenide in a liquid medium;

(c) contacting the composition resulting from step (b) with a gelling agent, thereby forming a sol-gel having a desired viscosity;

(d) coating said electroactive cathode layer with the composition resulting from step (c) and drying or curing said composition to form a solid layer of said electroactive transition metal chalcogenide composition which covers the outer surface of said electroactive cathode layer.

Examples of electroactive transition metal chalcogenides and electroactive sulfur-containing cathode materials for use in the above methods are described in detail above.

The temperature at which various components in the above processes are dissolved or dispersed is not critical and any temperature can be used so long as the desired solution or dispersion of the components in the liquid medium is obtained. For the fabrication of some composite cathodes it may be desirable to use higher temperatures so as to effect dissolution of one or more components during the process. A lower temperature may then be desired so as to effectively cause one or more components to separate out in a gel or precipitate form. Useful temperatures can be routinely determined experimentally by one skilled in the art. Preferred temperatures are those at which the transition metal chalcogenide initially dissolves or forms a colloidal solution in the liquid medium. Especially preferred temperatures are those which further provide for an economical process. Most preferred temperatures are those which further are close to room temperature or slightly above.

Optionally, binders, electrolytes, and conductive fillers may be added to the compositions at one or more of the various steps in the methods described above, usually at steps which involve dissolving, dispersing, or mixing. Such additives often facilitate or improve adhesion, cohesion, current collection, and ion transport.

Mixing of the various compositions in the methods described above can be accomplished by a variety of methods so long as the desired dispersion of the materials is obtained. Suitable methods of mixing include mechanical agitation, grinding, ultrasonication, ball-milling, sand milling, impingement milling, and the like.

Removal of some or all of the liquid from the various compositions in the methods described above can be accomplished by a variety of conventional means, so long as the resulting product has a desired porosity and/or pore size distribution, surface area, shape, chemical composition, adhesion to the current collector or other substrate, and the like. Useful methods for removal of liquid employ forced hot air convection, heat, infrared radiation, flowing gases, vacuum, reduced pressure, extraction, and the like. Preferred methods for removal of liquid include forced hot air convection, vacuum evaporation, reduced pressure, infrared heating, and flowing gas. Most preferred methods involve a combination of these preferred techniques.

It is well known in the art of battery electrode fabrication that, by casting a slurry of electrode components and removing the solvent, thin films and coatings with the desired thickness can be made. One of skill in the art will appreciate that, by flash evaporation of the solvent from a slurry of the electroactive transition metal chalcogenide and the electroactive sulfur-containing cathode material, one can produce finely divided powders with varying particle sizes. Powdered composite cathode materials prepared by the processes of the present invention can be hot or cold pressed, slurry coated or extruded onto current collecting materials by techniques known to those skilled in the art of battery electrode fabrication.

Examples of preferred composite cathodes prepared using the processes of the present invention include thin film structures up to about 25 μm in thickness, coatings on current collectors up to about 100 μm in thickness, and powdered composite structures.

Composite cathodes with the configuration shown in FIG. 3 can also be fabricated by vacuum evaporation of the electroactive transition metal chalcogenide composition on top of the electroactive sulfur-containing cathode material. Films and membranes of transition metal chalcogenide compounds such as $V_2O_5$ and $MnO_2$ can be deposited in vacuum using several techniques, including sputtering and electron-beam evaporation (e-beam) using target materials of the same. Both sputtering and e-beam may be done as reactive evaporation with a partial oxygen pressure in order to achieve the proper stoichiometry. Plasma spraying may also be applicable. Vacuum evaporation fabrication of composite cathodes of the present invention is preferred when said composite cathode material is used in an all solid-state cell fabricated using vacuum web coating technologies for most or all of the layers in the cell.

Rechargeable Battery Cells and Methods of Making Same

One aspect of the present invention pertains to a rechargeable, electric current producing cell which comprises:

(a) an anode, (b) a composite cathode of the present invention, and (c) an electrolyte that is stable in the presence of the anode and cathode.

Another aspect of the present invention pertains to methods of forming a rechargeable, electric current producing cell, said method comprising the steps of:

(a) providing an anode;

(b) providing a composite cathode of the present invention; and, (c) enclosing an electrolyte between said anode and said composite cathode.

The anode material may be comprised of one or more metals or metal alloys or a mixture of one or more metals and one or more alloys, wherein said metals are selected from the Group IA and IIA metals in the Periodic Table. Anodes comprising lithium and sodium are useful for the anode of the battery of the invention. The anode may also be alkali-metal intercalated carbon, such as $LiC_x$ where x is equal to or greater than 2. Also useful as anode materials of the present invention are alkali-metal intercalated conductive polymers, such as lithium, sodium or potassium doped polyacetylenes, polyphenylenes, polyquinolines, and the like. Examples of suitable anodes include lithium metal, lithium-aluminum alloys, lithium-tin alloys, lithium-carbon, lithium-graphite, calcium metal, aluminum, sodium, sodium alloys, and the like. Preferred anodes are those selected from the group of lithium metal and lithium-aluminum and lithium-tin alloys.

The electrolytes used in battery cells function as a medium for storage and transport of ions, and in the special case of solid electrolytes these materials additionally function as separator materials between the anodes and cathodes. Any liquid, solid, or solid-like material capable of storing and transporting ions may be used, so long as the material is chemically inert with respect to the anode and the cathode and the material facilitates the transportation of ions between the anode and the cathode.

Examples of useful electrolytes are solid electrolyte separators comprised of polyethers, PEO, polyimides, polyphosphazenes, polyacrylonitriles (PAN), polysiloxanes, polyether grafted polysiloxanes, derivatives of the foregoing, copolymers of the foregoing, crosslinked and network structures of the foregoing, blends of the foregoing, and the like to which is added an appropriate electrolyte salt.

Examples of useful gel-polymer electrolytes are those prepared from polymer matrices derived from polyethylene oxides, polypropylene oxides, polyacrylonitriles, polysiloxanes, polyimides, polyethers, sulfonated polyimides, perfluorinated membranes (Nafion™ resins), divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing, blends of the foregoing, and the like.

Examples of useful solvents or plasticizing agents as gel forming agents for electrolytes include ethylene carbonate (EC), propylene carbonate (PC), N-methyl acetamide, acetonitrile, sulfolane, tetraethyleneglycol dimethyl ether (TEGDME), 1,2-dimethoxyethane, polyethylene glycols, 1,3-dioxolanes, glymes, siloxanes, and ethylene oxide grafted siloxanes, and blends thereof. Particularly preferred solvents and plasticizing agents are those derived from graft copolymers of ethylene oxide and oligomers of poly(dimethyl siloxane) of general formula X, as described in U.S. Pat. No. 5,362,493,

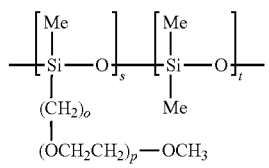

wherein o is an integer equal to or greater than 1; p is an integer equal to or greater than 0 and less than about 30; and, the ratio t/s is equal to or greater than 0. Values for o, p, s, and t can vary widely and depend on the desired properties for said liquid or plasticizing agent. Preferred agents of this type are those wherein o ranges from about 1 to 5, p ranges from about 1 to 20, and the ratio t/s is equal to or greater than 0.5. An especially preferred composition of formula X is that in which o is equal to 3, p is equal to 7, and the ratio of t to s is 1.

These liquid or plasticizing agents themselves, and blends thereof, are useful solvents to form liquid electrolytes which provide other effective electrolyte systems for the cells of the present invention. For example, glymes or sulfolane with lithium salts, such as $LiAsF_6$, are useful liquid electrolytes. 1,3-Dioxolane and TEGDME are especially useful as a blend of solvents for liquid electrolytes. Likewise, compositions of TEGDME or of formula X together with $LiSO_3CF_3$ are especially useful as liquid electrolytes.

Examples of ionic electrolyte salts for electrolytes include $MClO_4$, $MAsF_6$, $MSO_3CF_3$, $MSO_3CH_3$, $MBF_4$, $MB(Ph)_4$, $MPF_6$, $MC(SO_2CF_3)_3$, $MN(SO_2CF_3)_2$,

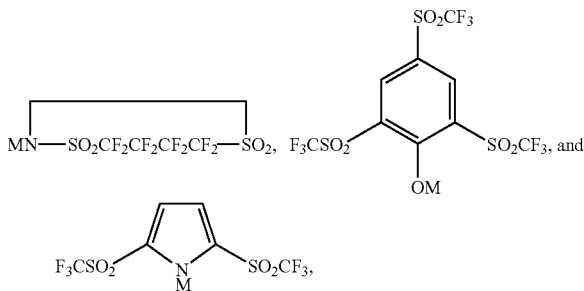

and the like, where M is Li or Na. Other electrolytes useful in the practice of this invention are disclosed in U.S. Pat. No. 5,538,812.

EXAMPLES

Several embodiments of the present invention are described in the following examples, which are offered by way of illustration and not by way of limitation.

Example 1

This example describes the fabrication of a composite cathode of the present invention. Vanadium oxide isopropoxide (25 mL, Alpha AESAR Co.) was placed in a dry flask and 500 mL of acetone (having 0.5% water) was added drop wise to the alkoxide liquid with constant stirring. The amount of acetone added was based on getting a final concentration of vanadium pentoxide ($V_2O_5$) in the sol (solution) of 4 g/100 mL. After mixing the vanadium oxide isopropoxide with acetone, a mixture of water-acetone (1 to 10 by volume) was added drop wise; the total molar ratio of water to vanadium alkoxide was 0.5, including the water present in the acetone. The color of the sol was yellow to orange. The molar ratio of water to alkoxide can be varied in the range 0.5 to 3.0, depending on the subsequent slurry and coating procedure desired.

A slurry of a electroactive sulfur-containing cathode material was made with the sol prepared above. A requisite amount of sulfur was taken in a mortar and a proportionate amount of sol was added to the agate mortar. The mixture was gently ground for 15 minutes. Dry carbon powder (Shawinigan 50AB black, hereafter designated as SAB) was then added and the mixture was ground again for 15 minutes with an additional amount of acetone being added. The composition of the slurry as expressed in terms of sulfur, vanadium pentoxide and carbon black was as follows: sulfur 80 wt %, $V_2O_5$ 15 wt % and carbon 5 wt %. This slurry was deposited on nickel foil using a doctor blade in a hood under ambient atmosphere. The coating was dried under an IR lamp overnight in ambient atmosphere. The coating after IR drying was further dried in a vacuum oven at 50° C. for one hour yielding the composite cathode on the current collector.

Example 2

In this example, a sulfur-containing composite cathode of the present invention with the configuration shown in FIG. 3 was fabricated on a nickel foil current collector substrate. The composition of the electroactive sulfur-containing cathode layer was as follows: 44 wt % sulfur, 26 wt % carbon (SAB), and 30 wt % of a UV curable binder comprising 25 wt % polyethylene glycol dimethacrylate, 25 wt % polyethylene glycol divinylether, and 50 wt % polyethylene glycol dimethyl ether. After UV curing of the cathode layer, the sulfur-containing cathode layer was coated with the $V_2O_5$ sol prepared in Example 1 using a dipping technique. Two dippings were made. Subsequently, the coated composite cathode was dried in a vacuum oven at 60° C. for an hour.

It was noted that the sulfur-containing cathode layer obtained by casting of the slurry was porous. It was found that the sol mix impregnated through the pores in the sulfur-containing cathode layer and formed a thin $V_2O_5$ gel layer at the pore boundaries as well as over the entire structure. It is anticipated that because of the low viscosity of the $V_2O_5$ sol, impregnation into the finer pores is also likely.

Example 3

Vanadium oxide isopropoxide (12.53 mL, Alpha AESAR Chemical Co.) was dissolved in anhydrous ethylene glycol dimethyl ether (DME) resulting in a slightly yellow solution. Subsequently 4.0 mL of a solution of 0.4644 g of water in 5 mL DME was added dropwise over 30 minutes at 20° C., with stirring under dry argon. The resulting yellow-brown, slightly translucent sol was stirred for 2.5 hour and stored under positive argon pressure. The concentration of vanadium oxide in the as synthesized sol was 4.4 g/100 mL. To this sol was added powdered sulfur and conductive carbon with mixing to make a slurry. Prior to use, the sulfur and carbon were dried in an oven at 60° C. and 180° C., respectively and subsequently stored in a dry room.

The slurry was processed using a ball milling technique. The jars and beakers used for the slurry making were dried in an oven at 110° C. for several hours and were stored in a dry room. The powdered sulfur was first mixed with the vanadium sol in a ball mill for 1 hour. Then, the carbon black (SAB) was added and the milling process continued. After 1 hour an additional amount of DME solvent was added to reduce the solid content to about 12 g/100 mL and the milling resumed for another 3 hours. This slurry was then cast onto a nickel foil by the doctor blade technique in a hood under ambient conditions. The wet coating was left overnight in a hood to air dry. The coating was then heat treated in an oven at 110° C. for 1 hour and then subsequently in a vacuum oven at 60° C. for 1 hour. The composition of the dry composite cathode was 75 wt % sulfur, 15 wt % $V_2O_5$ and 10 wt % C.

Example 4

A slurry similar to that described in Example 3 was made using a vanadium sol with acetone as solvent instead of DME. The molar ratio of water to alkoxide was 0.5. The procedure used to make the slurry was similar to that described in Example 3 with acetone as the solvent and a milling time of 15 hours. The conditions of deposition of the coating, drying and heat treatment were the same as that described in Example 3. The composition of the dried composite cathode was 80 wt % sulfur, 15 wt % $V_2O_5$, and 5 wt % conductive carbon. The cast composite cathode layer was 25 μm thick after drying.

Example 5

This example describes the fabrication and performance of flooded battery cells comprising the composite cathodes of the present invention. A working electrode with a composite cathode made by the procedure described in Example 1, prepared by dipping a Pt disk (0.015 cm$^2$) into the slurry of the carbon, sulfur, and vanadium pentoxide composite followed by drying under an IR-lamp, was immersed into an undivided electrochemical cell with lithium wire and lithium foil as reference and counter electrodes, respectively. The cell was filled with a 1 M solution of lithium triflate in electrolyte grade TEGDME.

Figure 5:
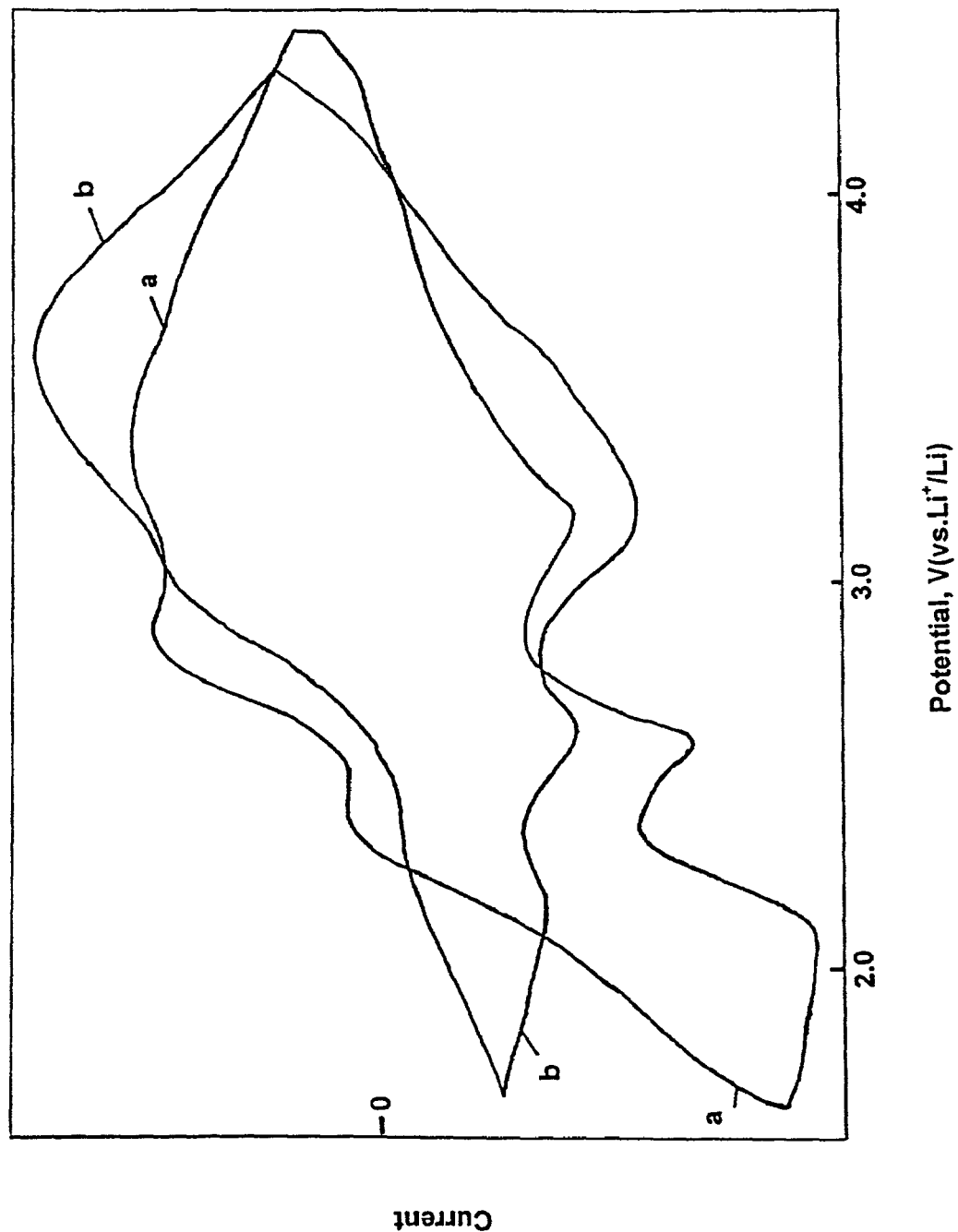
FIG. 5 shows cyclic voltammograms of a composite cathode of the present invention as described in Example 5: (a) initial scan, and (b) second scan.

Cyclic voltammograms of the electrode recorded at a scan rate of 1 mV/s at 25° C. are shown in FIG. 5. Three quasi-reversible reduction-oxidation peaks corresponding to formation of $\delta$-$V_2O_5$ and two steps of sulfur reduction confirm the composite nature of the material. Continuous cycling between 1.5 and 4.4 V results in decrease of both sulfur-related peaks. However, the electrode retains its integrity, indicating improved adhesion to the Pt surface. Parallel increase of the vanadium oxide peaks allows one to assume that some interconversion of material takes place, probably with formation of the ω-phase of vanadium pentoxide or a mixed vanadium oxo-sulfide. Such interconversion resulting in the increase of the apparent cathode potential should be suitable for improved battery performance.

Example 6

A working electrode, prepared by dipping a large area Pt current collector (2 cm$^2$) into the final slurry before coating of the carbon-sulfur-vanadium pentoxide composite of Example 3, followed by drying under an IR-lamp, was immersed into a 3-compartment electrochemical cell separated by glass filter membranes. The cell was filled with a 1 M solution of lithium triflate in electrolyte grade TEGDME. Lithium wire and lithium foil were used as reference and counter electrodes, respectively.

Figure 6:
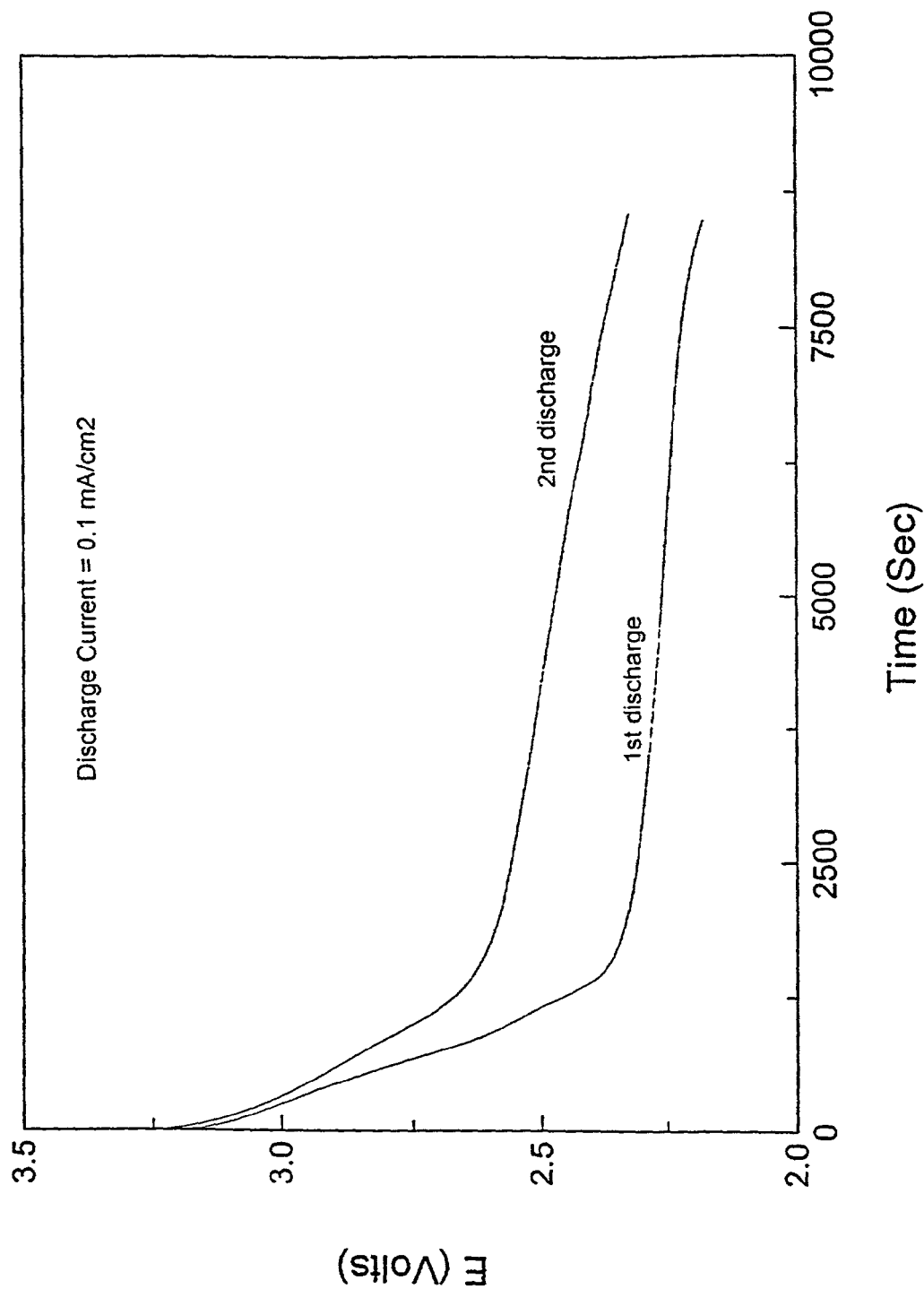
FIG. 6 shows discharge curves for a battery cell comprised of the composite cathode material described in Examples 3 and 6, a lithium anode, and an electrolyte of tetraethyleneglycol dimethyl ether (TEGDME) and lithium triflate at 25° C.
Figure 7:
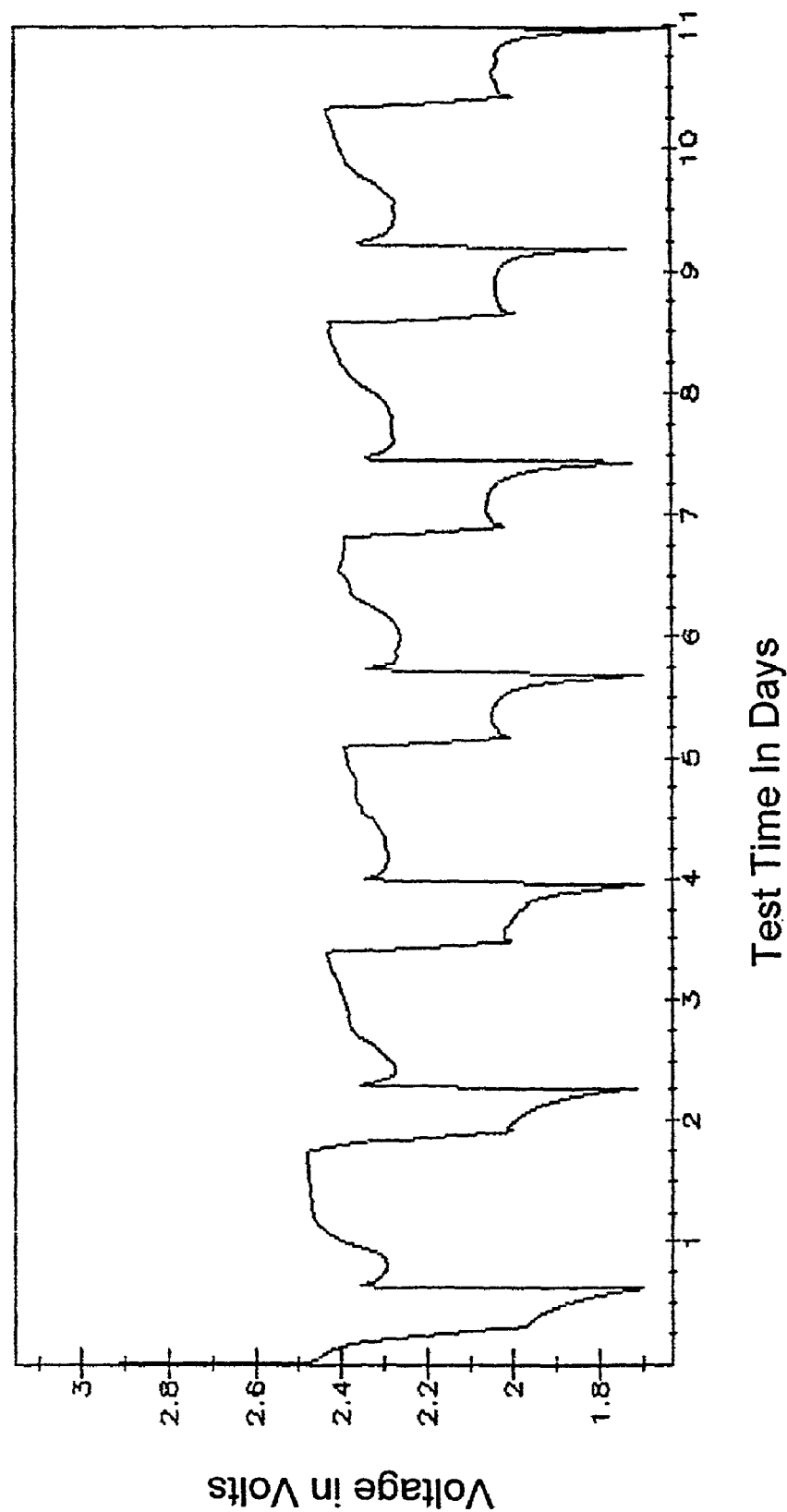
FIG. 7 shows charge-discharge curves for a battery cell containing a composite cathode described in Example 6.

The working electrode was galvanostatically charged/discharged at a current density of 0.1 mA/cm$^2$. Discharge curves at 25° C. are shown in FIG. 6. A significant increase in the electrode mid-potential can be seen at the second discharge compared to the first one. Additional charge/discharge curves are shown in FIG. 7 which indicate the appearance of increased capacity with cycle number.

Figure 8:
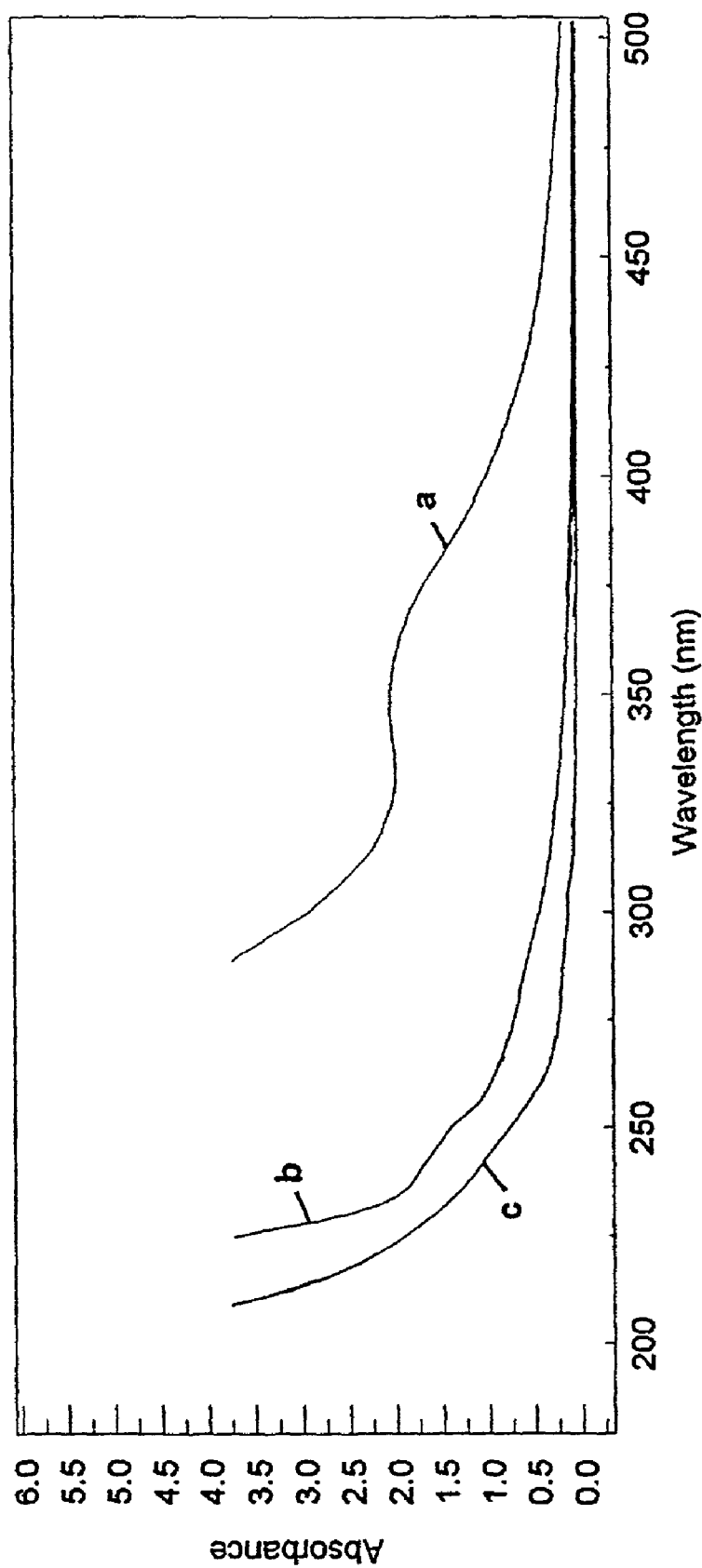
FIG. 8 shows the ultraviolet (UV)-visible absorption spectra of the liquid electrolytes removed from battery cells after cycling: (a) electrolyte from a battery cell comprising a sulfur and carbon cathode without an electroactive transition metal chalcogenide composition, and (b) the electrolyte from a similar battery cell containing a composite cathode of the present invention comprising the same sulfur and carbon materials and an electroactive $V_2O_5$ material. Curve (c) shows the spectrum of the electrolyte before cycling.

After 5 complete charge/discharge cycles, a small amount of the electrolyte solution from the working electrode compartment was removed for analysis. The UV-visible absorption spectrum of the solution is shown as curve (b) in FIG. 8. No significant absorption peaks in the 320-380 nm region were observed, indicating the absence of sulfide and polysulfide species in the electrolyte. For comparison, a control sulfur-containing electrode was prepared to compare the out-diffusion behavior of this cathode without the transition metal chalcogenide layer. The control cathode was made by dipping a Pt current collector (2 cm$^2$) into a slurry containing 50% of elemental sulfur, 30% of carbon black (SAB), and 20% of UV-curable binder. A electrochemical cell with the UV-cured electrode was assembled and tested as described above. A UV absorption spectrum of the electrolyte solution, taken after the first discharge, is shown in curve (a) of FIG. 8. A very strong absorption peak at about 350 nm owing to dissolved sulfides and polysulfides is easily observed. Curve (c) of FIG. 8 shows the absorption spectrum of the electrolyte solution of both the control and the vanadium pentoxide electrodes of the example before the first discharge cycle, showing the absence of any appreciable amounts of sulfides and polysulfides.

Example 7

This example describes the construction and performance of a button cell constructed from the composite cathode made in Example 1. The button cell was fabricated by the conventional method. The electroactive material (sulfur) in the composite cathode layer was 1.36 mg/cm$^2$. TEGDME electrolyte with lithium triflate salt was used as a liquid electrolyte. The separator used was CELGARD™ 2500 (Hoechst Celanese Corporation), and the anode was lithium metal. The cell was tested under the following conditions: current density 0.1 mA/cm$^2$, cycling voltage 2.75 V to 1.85 V. The cell capacity was initially around 504 mAh/g, but subsequently increased to 956 mAh/g and remained stable without fade after 30 cycles.

Example 8

A button cell similar to that described in Example 7 was constructed using the composite cathode fabricated in Example 2. The cell testing conditions were as follows: current density 0.1 mA/cm$^2$, cycling voltage 2.75 V to 1.85, 10 hours time limited. The initial cell capacity was around 1382 mAh/g. After 81 cycles the capacity was 738 mAh/g.

Example 9

A button cell was fabricated using the composite cathode of Example 3 using the conventional button cell configuration. A liquid electrolyte having TEGDME with lithium triflate salt was used as electrolyte. Celgard™ 2500 was used as a separator. The composite cathode provided the cell performance shown in Table 1.

TABLE 1

| Thickness (μm) Coating weight (g) | Capacity (mAh/g) at 0.1 mA/cm$^2$ (at cycle no.) | Capacity (mAh/g) at 0.2 mA/cm$^2$ (at cycle no.) | Capacity (mAh/g) at 0.3 mA/cm$^2$ (at cycle no.) |
| --- | --- | --- | --- |
| 45 μm 2 mg/cm$^2$ | 900 mAh/g (4) | 450 to 380 mAh/g (76) | 520 mAh/g (46) |
| 50 μm 1.2 mg/cm$^2$ | 1270 mAh/g (1) | 600 mAh/g (5) | No data. |
| 25 μm 2 mg/cm$^2$ | 880 mAh/g (2) | 700 mAh/g (8) | No data |

Example 10

Figure 9:
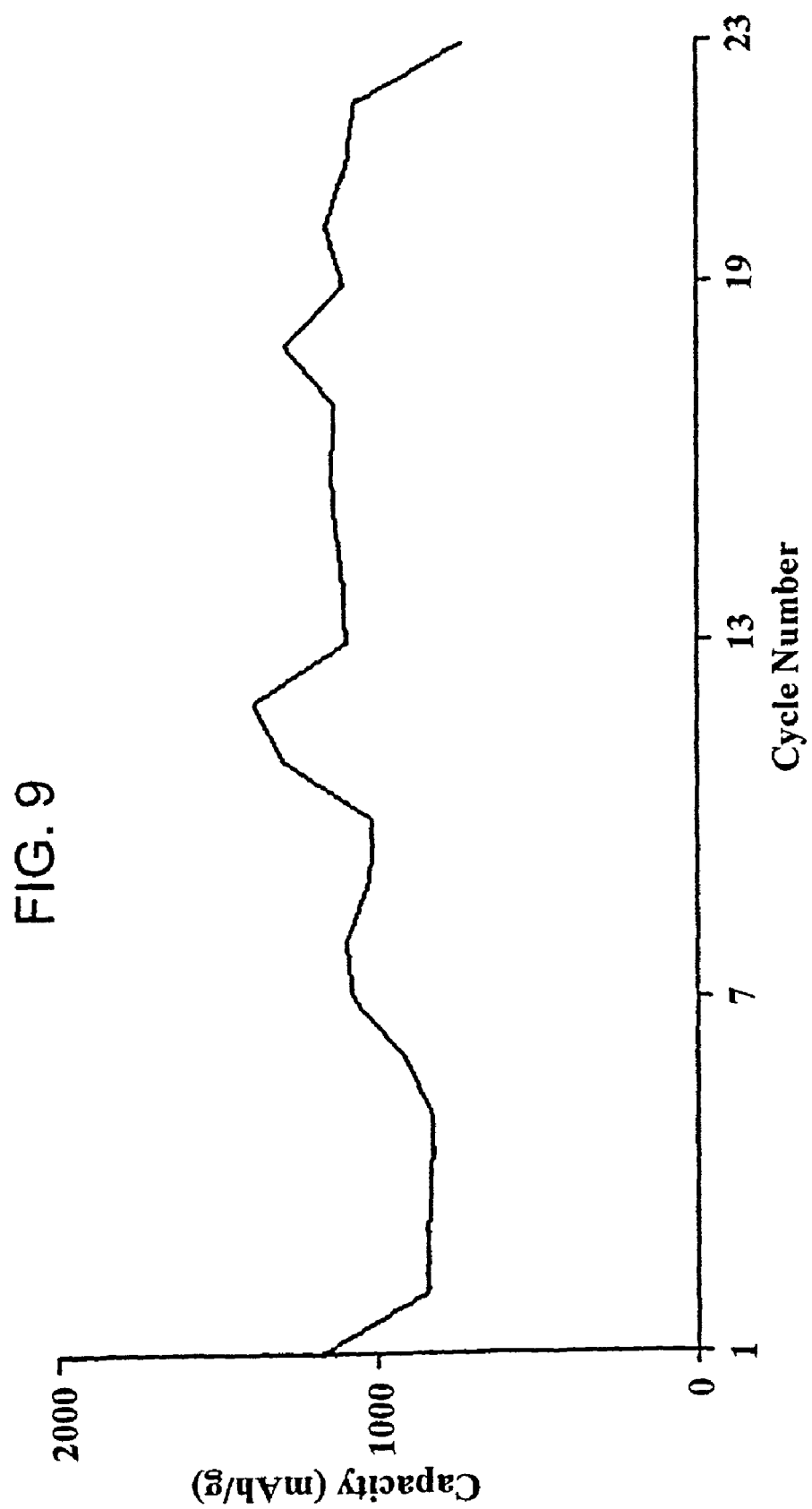
FIG. 9 is a plot of capacity versus cycle number for a rechargeable battery cell described in Example 10.

Button cells similar to those fabricated in Example 9 were fabricated using the composite cathode of Example 4. The thickness of the cathode layer was 25 μm and the amount of sulfur as electroactive material was 1.0 mg/cm$^2$. Evaluation of the cell performance gave the results shown in FIG. 9. The initial capacity at 0.1 mA/cm$^2$ was 1172 mAh/g, and the capacity after 20 cycles was 1103 mAh/g.

Example 11

This example describes the fabrication of a composite cathode containing conductive carbon and a polymeric binder. Elemental sulfur was ground in an IKA grinder for 5 seconds. Into a dry ceramic ball mill jar containing 35 pieces of ceramic cylinders was added 8.7 g of the ground sulfur, 1.5 g of dry V$_2$O$_5$ aerogel powder prepared by supercritical extraction of the solvent from a vanadium acetylacetonate sol, 3.0 g of dry conductive carbon (SAB), and 72 g of a 2.5 wt % solution of polyethylene oxide binder in acetonitrile. The jar was sealed and put onto the ball mill at a high speed of revolution for 22 hours. The milling was stopped and a sample of the slurry was withdrawn for analysis. The mean particle size was 6.4 μm, and the slurry exhibited a viscosity of 1142 cp 10 s$^{-1}$ and 58 cp at 740 s$^{-1}$ as determined by a Rheometrics model DSR200. This slurry was then used to cast hand drawn coatings onto both sides of a 17.5 μm thick nickel foil substrate with a wet thickness of 325 μm on each side. The coatings were dried under ambient conditions overnight, then further dried under vacuum at 60° C. for one hour. The resulting dry coating thickness was 75 μm on each side, and the weight of the electroactive cathode material was 1.09 mg/cm$^2$. The apparent density of the composite cathode was 0.496 g/cm$^3$.

Example 12

This example describes the fabrication and performance of AA sized cells constructed using the composite cathode made in Example 11. On top of one side of the composite cathode structure fabricated in Example 11 was placed a piece of Celgard 2500 separator and on top of this was placed a piece of lithium foil (Cyprus, 50 μm thick). This set of sandwiched battery electrodes was then rolled up into a "jelly roll" configuration and placed into a AA battery sized metal container. The container was filled with the electrolyte comprising 1 M lithium triflate in TEGDME, and the lid was sealed onto the container after making the appropriate internal connections. The battery cell was then discharged and charged for 400 cycles. The first discharge cycle exhibited a total capacity of 726 mAH and a specific capacity for the electroactive cathode material of 1232 mAh/g. By the third cycle, the total capacity of the cell was fairly steady between 387-396 mAh, and the specific capacity was 650-670 mAh/g.

Example 13

This example describes the fabrication of a composite cathode containing a carbon-sulfur polymer of general formula VI, where z was 4.8. The procedure of Examples 11 and 12 were followed except that a carbon-sulfur polymer of formula VI, where z was 4.8, was substituted in equal amounts for the ground sulfur. The resulting dry coating thickness was 44 μm on each side, and the weight of the electroactive cathode material was 0.77 mg/cm$^2$.

The first discharge cycle exhibited a total capacity of 495 mAh and a specific capacity for the electroactive cathode material of 1269 mAh/g. By the fifth cycle, the total capacity of the cell was fairly steady between 165-218 mAh, and the specific capacity was 417-559 mAh/g.

Example 14

The following procedures was used to prepare transition metal chalcogenides impregnated with soluble electroactive sulfur-containing cathode species.

To 500 mL of toluene was added 72 g of sulfur and 48 g of vanadium oxide aerogel powder. The mixture was refluxed at 110° C. for 3 hours with constant stirring. The product was filtered and washed with acetone and dried in vacuum at 90° C. for 4 hours. The sulfur content of the impregnated product was 57.3 wt %.

By varying the relative amount of sulfur compared to the aerogel, the sulfur content of impregnated aerogel could be varied from 50 wt % to 82 wt %. Elemental analysis has shown the final impregnated product contains small amounts of carbon. An elemental analysis of sulfur-impregnated vanadia aerogel with 76.81 wt % sulfur content showed 18.49 wt % vanadium, 0.54 wt % carbon, and 4.16 wt % oxygen (calculated by difference).

Example 15

This example describes the fabrication of composite cathodes containing sulfur impregnated aerogel powder prepared as described in Example 14 with an overall content of electroactive material of 55 wt % sulfur and 45 wt % vanadium oxide. The sulfur-impregnated aerogel was ground in an agate mortar to break agglomerates and produce a fine powder. To a ball mill jar containing ceramic cylinders was added 45 g of elemental sulfur, 22.5 g of the sulfur-impregnated (55 wt % sulfur) vanadia aerogel, 13.5 g of carbon (SAB) and 90 g of a 1 wt % solution of polyethylene oxide dissolved in a mixed solvent of methyl acetate and n-propanol (90:10 wt ratio). The solid content of the slurry was 11 wt %. The mixture was ball milled for 22 hours. The slurry was cast hand drawn onto both sides of a 18 μm thick conductive carbon coated aluminum foil (Rexam Graphics, South Hadley, Mass.) as a current collector. The coatings were dried under ambient conditions overnight, and then under vacuum at 60° C. for one hour. The resulting dry cathode coating had a thickness in the range of 60 to 70 μm on each side of the current collector, with a density of electroactive cathode material in the range of 2.1 mg/cm$^2$ to 2.7 mg/cm$^2$. The volumetric density of the electroactive materials was 293 to 389 mg/cm$^3$.

Wound AA size cells were fabricated from these cathodes with a 4 mil (0.1 mm) lithium anode and a TONEN™ (Tonen Chemical Corporation) polyolefin separator. The cells were filled with a liquid electrolyte (50% 1,3-dioxolane, 20% diglyme, 10% sulfolane and 20% dimethoxyethane (DME) by volume). The cells were cycled at a rate of charge and discharge of 0.32 mA/cm$^2$ and 0.5 mA/cm$^2$ respectively. Cell performance data showed that these cathodes had good capacity and stability. They showed a low rate of capacity loss with cycling with values ranging from 0.003 to 1.7 mAh/cycle for the first 50 cycles. In some cells the capacity actually increased up to the 25th cycle at rates ranging from 0.32 to 1.32 mAh/cycle.

Example 16

Figure 10:
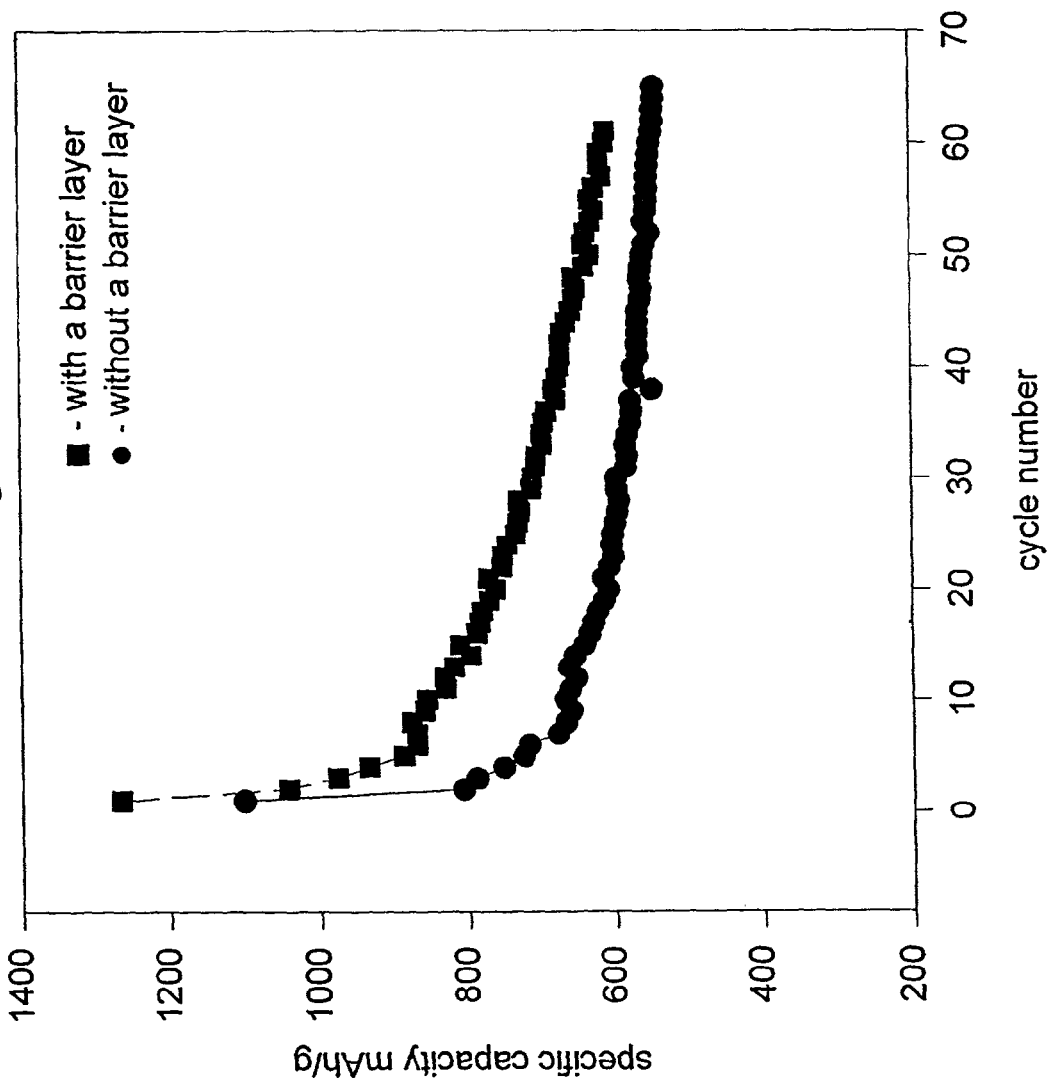
FIG. 10 is a plot of the specific capacity versus cycle number for rechargeable batteries with (●) and without (■) a surface barrier coating comprising a transition metal chalcogenide composition described in Example 16.

This example describes the cathode design and process whereby a coating of sulfur-containing electroactive cathode material is coated with a layer of electroactive transition metal chalcogenide. Cathodes prepared from a slurry coating on a conductive carbon coated aluminum foil (Rexam Graphics, South Hadley, Mass.) as a current collector with a composition of 53 wt % sulfur, 16 wt % carbon (SAB), 26 wt % $V_2O_5$ and 5 wt % PEO, were coated with a barrier layer of vanadia sol. The coating layer was prepared by dissolving 2 wt % vanadium oxide tri-isopropoxide and 0.75 wt % polyethylene oxide (molecular weight 5,000,000) in a 90:10 methylacetate/n-propanol solvent blend and hand coating this solution using the doctor blade technique on top of the dried cathode. The coating layer thickness was approximately 10 μm and the amount of vanadia xerogel in the layer was in the range of 0.25 to 0.4 mg/cm$^2$. An identical cathode without a barrier coating was used as a control. Wound AA cells were constructed from the above cathodes using a 3 mil (0.075 mm) lithium anode and a TONEN™ separator. A liquid electrolyte consisting of 50% 1,3-dioxolane, 20% diglyme, 10% sulfolane and 20% dimethoxyethane (DME) (by volume) was used. FIG. 10 shows data for typical AA wound cells with the vanadia xerogel coated cathode (●) and an uncoated control cathode (■) cycled at a charge and discharge rate of 0.57 mA/cm$^2$. It is evident from this data that the vanadia xerogel coating layer has a significant positive effect on the specific capacity of the cathode and on the reduction of capacity fading with cycling.

Example 17

In a second approach to that described in example 16, amorphous submicron vanadia aerogel powders were dispersed in a PEO polymer matrix in a 70:30 ratio by weight. A 4 wt % solids dispersion of this mixture in acetonitrile was applied to the surface of a control cathode sheet similar to that of Example 16 by either a dipping or doctor blade technique. The thickness of the coating layer was in the range of 5 to 7 μm. Cycling data from these cells showed a similar increase in the specific capacities and in the reduction of capacity fading with cycling, compared to the control with no vanadia aerogel overcoating, as shown in Example 16.

While the invention has been described in detail and with reference to specific embodiments thereof, it will be apparent to one skilled in the art that various changes and modifications can be made without departing from the spirit and scope thereof.

The invention claimed is:
1. A battery cell comprising:
 (a) an anode comprising a metal or an ion of a metal;
 (b) a cathode comprising a mixture of:
  (i) an electrochemically active material comprising sulfur in the form of at least one of elemental sulfur, a sulfide of the metal, and a polysulfide of the metal, and
  (ii) an electronically conductive material; and
 (c) a liquid electrolyte comprising a solvent for at least some discharge products of said cathode, wherein the battery cell is characterized by a separation distance between a back boundary where the liquid electrolyte is farthest removed from said anode and a front boundary where the liquid electrolyte is nearest said anode, wherein the separation distance is about 125 micrometers, and, wherein the mixture of the electrochemically active material and the electronically conductive material comprises an electroactive transition metal chalcogenide.

* * * * *

UNITED STATES PATENT AND TRADEMARK OFFICE
CERTIFICATE OF CORRECTION

PATENT NO. : 7,939,198 B2  
APPLICATION NO. : 09/795915  
DATED : May 10, 2011  
INVENTOR(S) : Shyama P. Mukherjee et al.

Page 1 of 1

It is certified that error appears in the above-identified patent and that said Letters Patent is hereby corrected as shown below:

On the first page of the patent, section (63), please replace the following text:

Continuation of application No. 09/293,498, filed on Apr. 15, 1999, now Pat. No. 6,238,821, and a continuation of application No. 08/859,996, filed on May 21, 2007, now Pat. No. 5,919,587.

with the following amended text:

Continuation of application No. 09/293,498, filed on Apr. 15, 1999, now Pat. No. 6,238,821, which is and a continuation of application No. 08/859,996, filed on May 21, 2007, now Pat. No. 5,919,587.

Signed and Sealed this  
Fourth Day of October, 2011

David J. Kappos  
*Director of the United States Patent and Trademark Office*